United States Patent
Igarashi et al.

(10) Patent No.: US 10,975,236 B2
(45) Date of Patent: Apr. 13, 2021

(54) RESIN MIXTURE AND MULTILAYER STRUCTURE

(75) Inventors: Takeyuki Igarashi, Kurashiki (JP); Shinji Tai, Houston, TX (US)

(73) Assignee: KURARAY CO., LTD., Kurashiki (JP)

( * ) Notice: Subject to any disclaimer, the term of this patent is extended or adjusted under 35 U.S.C. 154(b) by 312 days.

(21) Appl. No.: 13/883,194

(22) PCT Filed: Nov. 1, 2011

(86) PCT No.: PCT/JP2011/075173
§ 371 (c)(1),
(2), (4) Date: May 2, 2013

(87) PCT Pub. No.: WO2012/060371
PCT Pub. Date: May 10, 2012

(65) Prior Publication Data
US 2013/0225756 A1    Aug. 29, 2013

(30) Foreign Application Priority Data
Nov. 2, 2010   (JP) .............................. JP2010-245812

(51) Int. Cl.
*C08L 31/04*   (2006.01)
*B32B 27/32*   (2006.01)
(Continued)

(52) U.S. Cl.
CPC .............. *C08L 31/04* (2013.01); *B32B 27/30* (2013.01); *B32B 27/306* (2013.01); *B32B 27/32* (2013.01);
(Continued)

(58) Field of Classification Search
CPC .......... C08L 31/02; C08L 31/04; C08L 31/06; B32B 27/306
See application file for complete search history.

(56) References Cited

U.S. PATENT DOCUMENTS

| | | | | |
|---|---|---|---|---|
| 5,389,709 A | * | 2/1995 | Itamura | ................ C08K 3/0033 524/239 |
| 5,492,953 A | | 2/1996 | Itamura et al. | |

(Continued)

FOREIGN PATENT DOCUMENTS

| | | |
|---|---|---|
| JP | 2 261863 | 10/1990 |
| JP | 3 72542 | 3/1991 |

(Continued)

OTHER PUBLICATIONS

International Search Report dated Feb. 14, 2012 in PCT/JP11/75173 Filed Nov. 1, 2011.

(Continued)

*Primary Examiner* — Ling Siu Choi
*Assistant Examiner* — David L Miller
(74) *Attorney, Agent, or Firm* — Oblon, McClelland, Maier & Neustadt, L.L.P.

(57) ABSTRACT

Provided is a resin mixture, comprising: polyolefin (A); a saponified ethylene-vinyl acetate copolymer (B); and an acid modified olefin-vinyl carboxylate copolymer (C), wherein the acid modified olefin-vinyl carboxylate copolymer (C) has an olefin content of from 50 to 95 mol %, and a difference between an ethylene content of the saponified ethylene-vinyl acetate copolymer (B) and the olefin content of the acid modified olefin-vinyl carboxylate copolymer (C) is within a range of from 20 to 70 mol %. This enables to provide a resin mixture that contains polyolefin and an EVOH, and even in continuous melt molding over a long period of time, has a less amount of screw buildup of a degraded material and also is reduced in generation of fish-eyes, cords, and streaks in a molded product obtained therefrom.

16 Claims, 3 Drawing Sheets

(51) Int. Cl.
  *B32B 27/30* (2006.01)
  *C08L 31/02* (2006.01)
  *C08K 5/00* (2006.01)
  *C08L 23/10* (2006.01)
  *C08L 31/06* (2006.01)
  *C08L 23/12* (2006.01)

(52) U.S. Cl.
  CPC ............ *C08L 31/02* (2013.01); *B32B 2270/00* (2013.01); *B32B 2272/00* (2013.01); *C08K 5/0016* (2013.01); *C08L 23/10* (2013.01); *C08L 23/12* (2013.01); *C08L 31/06* (2013.01); *C08L 2203/16* (2013.01); *C08L 2205/03* (2013.01)

(56) References Cited

U.S. PATENT DOCUMENTS

| | | | |
|---|---|---|---|
| 6,472,470 B1 * | 10/2002 | Fujiwara | C08F 8/12 524/557 |
| 2010/0255330 A1 * | 10/2010 | Ninomiya | C08L 23/0853 428/516 |
| 2011/0091734 A1 | 4/2011 | Kazeto | |
| 2012/0009431 A1 | 1/2012 | Kazeto | |
| 2012/0196970 A1 | 8/2012 | Igarashi et al. | |
| 2013/0022768 A1 * | 1/2013 | Igarashi | B32B 27/08 428/36.4 |
| 2013/0037980 A1 | 2/2013 | Igarashi et al. | |
| 2013/0040157 A1 | 2/2013 | Igarashi et al. | |

FOREIGN PATENT DOCUMENTS

| | | | |
|---|---|---|---|
| JP | 2001 79998 | | 3/2001 |
| JP | 2001079998 A | * | 3/2001 |
| JP | 2002 121342 | | 4/2002 |
| JP | 2002 234971 | | 8/2002 |
| JP | 2009 97010 | | 5/2009 |
| JP | 2010208331 A | * | 9/2010 |
| WO | 2011 125751 | | 10/2011 |
| WO | WO-2011125751 A1 | * | 10/2011 ........... B32B 27/306 |

OTHER PUBLICATIONS

U.S. Appl. No. 12/991,757, filed Nov. 9, 2010, US2011/0091734 A1, Kazeto.
U.S. Appl. No. 13/256,110, filed Sep. 12, 2011, US2012/0009431 A1, Kazeto.
U.S. Appl. No. 13/499,831, filed Apr. 2, 2012, US2012/0196970 A1, Igarashi, et al.
U.S. Appl. No. 13/637,448, filed Sep. 26, 2012, US2013/0040157 A1, Igarashi, et al.
U.S. Appl. No. 13/638,730, filed Oct. 1, 2012, US2013/0022768 A1, Igarashi, et al.
U.S. Appl. No. 13/643,583, filed Oct. 26, 2012, US2013/0037980 A1, Igarashi, et al.

* cited by examiner

[Fig. 1]
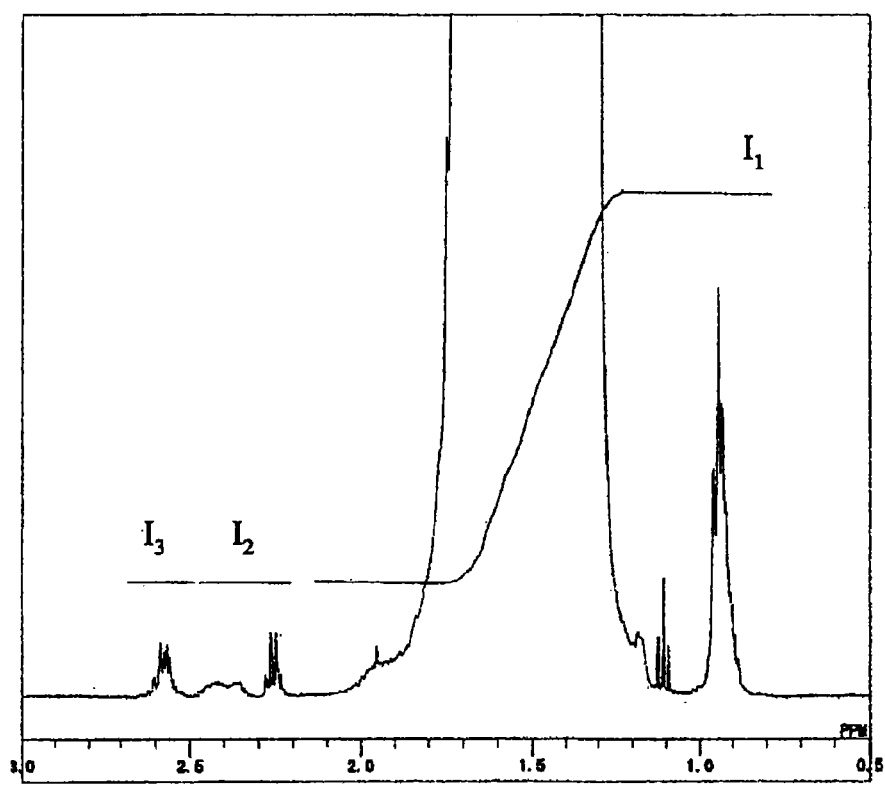

[Fig. 2]
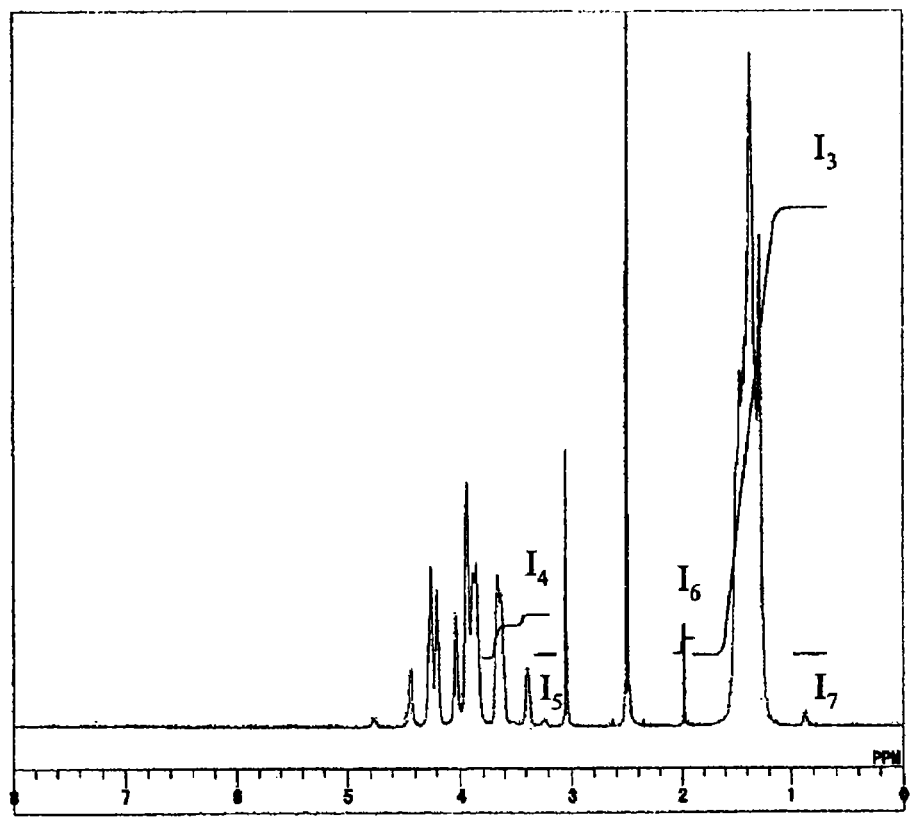

[Fig. 3]
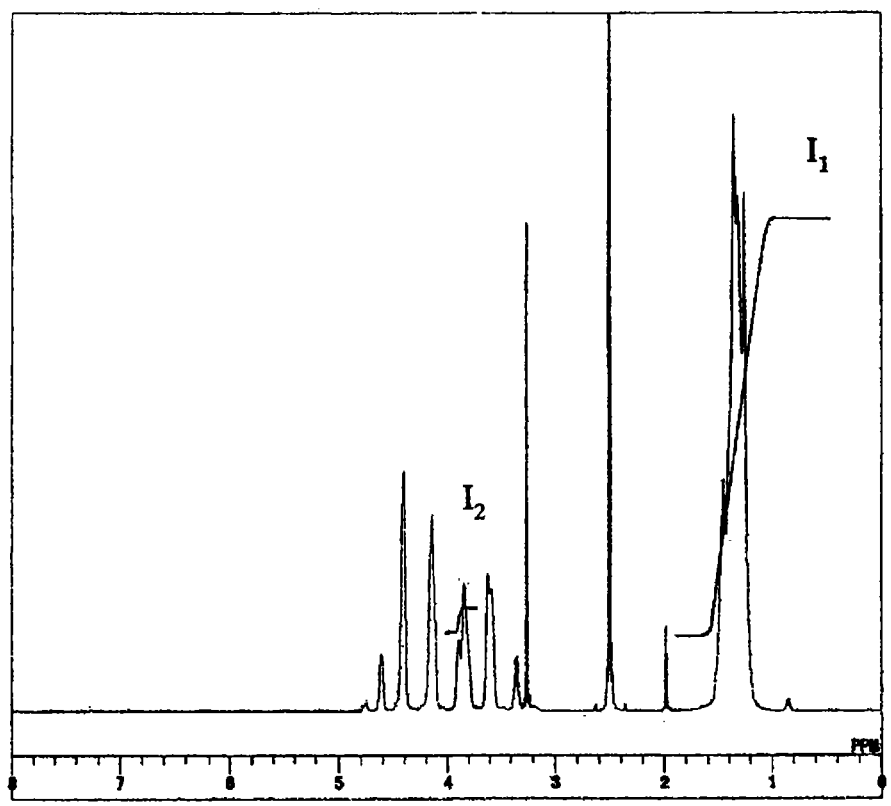

RESIN MIXTURE AND MULTILAYER STRUCTURE

TECHNICAL FIELD

The present invention relates to a resin mixture containing polyolefin and a saponified ethylene-vinyl acetate copolymer. The present invention also relates to a multilayer structure having a layer obtained by melt molding the resin mixture.

BACKGROUND ART

Conventionally, multilayer structures including a layer of a thermoplastic resin represented by polyolefin, such as polyethylene and polypropylene, and a layer of a saponified ethylene-vinyl acetate copolymer (hereinafter, may be abbreviated as an EVOH) excellent in barrier properties are widely used for various applications, particularly such as food packaging containers and fuel containers, taking advantage of their barrier properties. Such a multilayer structure is used as various molded products, such as a film, a sheet, a cup, a tray, and a bottle. At this time, there is a case that offcuts, defective products, and the like generated when obtaining the various molded products are collected and melt molded to be reused as at least one layer of a multilayer structure including a thermoplastic resin layer and an EVOH layer. Such a recovery technique is useful from the perspective of the reduction of wastes and the economic efficiency and is employed widely.

However, when reusing a recovery of a multilayer structure including a thermoplastic resin layer and an EVOH layer, gelation occurs due to thermal degradation during the melt molding or a degraded material sticks to a screw in an extruder and the like, and thus it used to be difficult to carry out continuous melt molding for a long period of time. Further, since such a degraded material is often mixed into a molded product, there used to be a problem of generating fish-eyes in a molded product thus obtained. There also used to be a problem of generating streaks (stripe pattern) on a surface due to the poor compatibility of a thermoplastic resin with an EVOH.

As a measure to solve such problems, Patent Document 1 describes a resin composition, containing an olefin-vinyl carboxylate copolymer and/or a saponification product thereof, a metal salt of fatty acid, and/or a metal compound as a resin composition to be blended into a ground product containing an EVOH. According to the resin composition, it is considered that, even in repeated scrap return and a continuous operation over a long period of time, a phase separation foreign matter (die build-up) of polyolefin and an EVOH is not mixed into a molded product and the mechanical properties, such as the impact resistance of a regrind layer, do not decrease.

Patent Document 2 describes a resin composition containing an acid graft modified polyolefin-based resin and a metal salt of fatty acid and/or a metal compound as a resin composition to be blended into a ground product containing an EVOH. According to the resin composition, it is considered that, even in repeated scrap return and a continuous operation over a long period of time, a phase separation foreign matter (die build-up) of polyolefin and an EVOH is not mixed into a molded product and the mechanical properties, such as the impact resistance of a regrind layer, do not decrease.

However, in the inventions described in Patent Documents 1 and 2, while an effect of preventing a phase separation foreign matter from being generated is found to a certain extent due to the improvement in compatibility of a thermoplastic resin with an EVOH, there used to be a case that the effect of suppressing generation of fish-eyes and streaks in a molded product is insufficient for applications requiring a molded product more highly beautiful in appearance. Further, in recent years, since there is a demand for a colored molded product with good appearance due to diversified consumer needs, a multilayer structure including an EVOH layer and a thermoplastic resin layer often contains a pigment. However, when the multilayer structure is collected for reuse, the pigment blended therein and the EVOH aggregate and thus a degraded material is more easily generated than a case of not containing a pigment, which sometimes becomes a problem.

PRIOR ART DOCUMENTS

Patent Documents

Patent Document 1: JP 2002-234971A
Patent Document 2: JP 2002-121342A

SUMMARY OF THE INVENTION

Problems to be Solved by the Invention

The present invention has made to solve the above problems, and it is an object of the present invention to provide a resin mixture that contains polyolefin and an EVOH, has a less amount of screw buildup of a degraded material even in continuous melt molding over a long period of time, and also is reduced in generation of fish-eyes, cords, and streaks in a molded product thus obtained.

Means for Solving the Problems

The above problems are solved by providing a resin mixture, comprising: polyolefin (A); a saponified ethylene-vinyl acetate copolymer (B); and an acid modified olefin-vinyl carboxylate copolymer (C), wherein
the acid modified olefin-vinyl carboxylate copolymer (C) has an olefin content of from 50 to 95 mol %, and
a difference between an ethylene content of the saponified ethylene-vinyl acetate copolymer (B) and the olefin content of the acid modified olefin-vinyl carboxylate copolymer (C) is within a range of from 20 to 70 mol %.

At this time, it is preferred that the acid modified olefin-vinyl carboxylate copolymer (C) has an amount of acid modification of from 0.01 to 2 mmol/g.

It is preferred that the saponified ethylene-vinyl acetate copolymer (B) has an ethylene content of from 20 to 60 mol % and has a degree of saponification of 80% or more. Further, it is more preferred that the saponified ethylene-vinyl acetate copolymer (B) has a ratio ((I+II)/(III+IV+V)) of 0.03 mol % or more of a total of carboxylic acids units (I) and lactone ring units (II) in a polymer terminal to a total of ethylene units (III), vinyl alcohol units (IV), and vinyl ester units (V).

It is also preferred that a content of the acid modified olefin-vinyl carboxylate copolymer (C) is from 0.1 to 30 mass % to the saponified ethylene-vinyl acetate copolymer (B). It is also preferred that a content of the saponified ethylene-vinyl acetate copolymer (B) is from 0.1 to 30 mass % to a total of the resin mixture.

It is also preferred that a difference between a solubility parameter of the acid modified olefin-vinyl carboxylate copolymer (C) and a solubility parameter of the saponified ethylene-vinyl acetate copolymer (B) is within a range of from 0.5 to 4.0 $(cal/cm^3)^{1/2}$.

It is also preferred that the resin mixture further comprises alkali metal, wherein a molar ratio of a content of the alkali metal to an amount of acid modification of the resin mixture is within a range of from 0.05 to 75. It is also preferred that the resin mixture further comprises an unmodified olefin-vinyl carboxylate copolymer (D), wherein the unmodified olefin-vinyl carboxylate copolymer (D) has an olefin content of from 50 to 98 mol %, and a content of the unmodified olefin-vinyl carboxylate copolymer (D) is from 0.01 to 20 mass % to a total of the resin mixture. It is also preferred that the resin mixture further comprises a lubricant (E), wherein a content of the lubricant (E) is from 0.005 to 1.0 mass % to a total of the resin mixture. It is also preferred that the resin mixture further comprises a pigment, wherein a content of the pigment is from 0.0001 to 10 mass % to a total of the resin mixture.

The above problems are also solved by a multilayer structure, comprising a layer obtained by melt molding the resin mixture.

The above problems are also solved by a method of producing the resin mixture according to any one of claims 1 through 11, comprising: mixing a recovery of a multilayer structure having a layer of a resin composition containing the polyolefin (A) and a layer of the saponified ethylene-vinyl acetate copolymer (B), and a recycling agent of a resin composition containing the acid modified olefin-vinyl carboxylate copolymer (C).

Effects of the Invention

By the resin mixture of the present invention, it is enabled to provide a molded product, in particular a multilayer structure, that has a less amount of screw buildup of a degraded material even in continuous melt molding over a long period of time and also is reduced in generation of fish-eyes, cords, and streaks.

BRIEF DESCRIPTION OF THE DRAWINGS

FIG. 1 A chart of typical $^1$H-NHR measurement of an EVOH.
FIG. 2 A chart of typical $^1$H-NHR measurement of an EVOH.
FIG. 3 A chart of typical $^1$H-NHR measurement of an EVOH.

MODE FOR CARRYING OUT THE INVENTION

A resin mixture of the present invention, comprises: polyolefin (A); a saponified ethylene-vinyl acetate copolymer (B) (hereinafter, may be abbreviated as an EVOH); and an acid modified olefin-vinyl carboxylate copolymer (C).

The polyolefin (A) used in the present invention contains, for example: (low density, linear low density, medium density, high density, or the like) polyethylene; an ethylene-based copolymer obtained by copolymerizing ethylene with α-olefins, such as 1-butene, 1-hexene, and 4-methyl-1-pentene, or acrylic ester; polypropylene; a propylene-based copolymer obtained by copolymerizing propylene with α-olefins, such as ethylene, 1-butene, 1-hexene, and 4-methyl-1-pentene; poly(1-butene), poly(4-methyl-1-pentene), or modified polyolefin obtained by reacting maleic anhydride to the polyolefins described above; an ionomer resin; or the like. Among all, as the polyolefin (A), a polypropylene-based resin, such as polypropylene and a propylene-based copolymer, or a polyethylene-based resin, such as polyethylene and an ethylene-based copolymer, is preferred. One type of the polyolefin (A) may be used singly, or two or more types may also be used in combination.

The polyolefin (A) has a melt index (MI; measured at 190° C., under the load of 2160 g) of preferably 0.03 g/10 minutes or more, and more preferably 0.05 g/10 minutes or more. It is also preferably 100 g/10 minutes or less, more preferably 80 g/10 minutes or less, and even more preferably 70 g/10 minutes or less.

The content of the polyolefin (A) is preferably from 50 to 99.8 mass % to a total of the resin mixture. In a case of less than 50 mass %, adhesion of a multilayer structure having a layer obtained by melt molding the resin mixture to a polyolefin layer sometimes decreases. The content is more preferably 55 mass % or more, and even more preferably 60 mass % or more. In contrast, in a case of more than 99.8 mass %, the effect of cost reduction by recovery becomes poor, which is not preferred from the economic perspective. The content is more preferably 99.5 mass % or less.

The EVOH (B) used in the present invention is obtained by saponifying vinyl acetate units in an ethylene-vinyl acetate copolymer. The EVOH (B) has carboxylic acids units (I) and lactone ring units (II) in a polymer terminal thereof, and has ethylene units (III), vinyl alcohol units (IV), and vinyl ester units (V) as units to form the backbone.

The respective units (I) through (V) are as the following formulas.

[chem. 1]

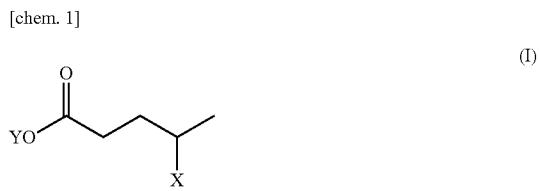

(I)

[wherein, X denotes a hydrogen atom, a hydroxyl group, or an esterified hydroxyl group, and Y denotes a hydrogen atom, alkali metal, or alkali earth metal.]

[chem. 2]

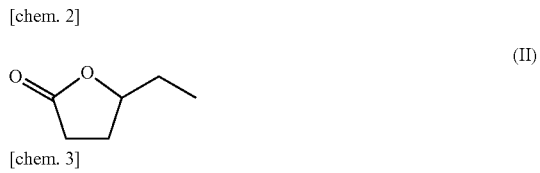

(II)

[chem. 3]

(III)

[chem. 4]

(IV)

[chem. 5]

(V)

$$\begin{array}{c} H_2 \;\; H \\ -C - C - \\ \;\;\;\;\;\; | \\ \;\;\;\;\;\; O - C - R_1 \\ \;\;\;\;\;\;\;\;\;\;\; \| \\ \;\;\;\;\;\;\;\;\;\;\; O \end{array}$$

[wherein, $R_1$ denotes a linear or branched alkyl group, preferably a methyl group, an ethyl group, an n-propyl group, an isopropyl group, a t-butyl group, or a trifluoromethyl group.]

Herein, the ethylene content means a ratio (III/(III+IV+V)) of ethylene units (III) to a total of ethylene units (III), vinyl alcohol units (IV), and vinyl ester units (V), and the degree of saponification of vinyl ester units means a ratio (IV/(IV+V)) of vinyl alcohol units (IV) to a total of vinyl alcohol units (IV) and vinyl ester units (V).

The EVOH (B) preferably has an ethylene content of from 20 to 60 mol %. In a case of an ethylene content of less than 20 mol %, the compatibility with the polyolefin (A) is prone to become defective. The ethylene content is more preferably 25 mol % or more. In a case of the ethylene content of more than 60 mol %, the gas barrier properties decrease. The ethylene content is more preferably 55 mol % or less, and even more preferably 50 mol % or less. Meanwhile, from the perspective of barrier properties, the degree of saponification of vinyl acetate units in the EVOH (B) is preferably 80% or more, more preferably 98% or more, and even more preferably 99% or more. In particular, an EVOH having an ethylene content of from 20 to 55 mol % and also having a degree of saponification of 99% or more is used for containers excellent in barrier properties and thus is often contained in a recovery by being laminated with polyolefin.

The EVOH (B) preferably has a ratio ((I+II)/(III+IV+V)) of 0.03 mol % or more of a total of carboxylic acids units (I) and lactone ring units (II) in a copolymer terminal to a total of ethylene units (III), vinyl alcohol units (IV), and vinyl ester units (V). When the ratio is high, the EVOH (B) usually tends to react with each other during the melt molding to lower the long run processability while the acid modified olefin-vinyl carboxylate copolymer (C) is contained in the present invention, thereby enabling to suppress the lowering of the long run productivity due to the reaction of the EVOH (B) with each other. In contrast, in a case of the ratio of less than 0.03 mol %, the EVOH (B) excessively reacts with the acid modified olefin-vinyl carboxylate copolymer (C) or an adhesive resin during the melt molding, so that there is a case of lowering the long run productivity.

The EVOH (B) may also have another polymerizable monomer copolymerized therein as long as not inhibiting the effects of the invention, which is generally in a range of 5 mol % or less. Such polymerizable monomer may include, for example: α-olefins, such as propylene, 1-butene, 1-hexene, and 4-methyl-1-pentene; (meth)acrylic ester; unsaturated carboxylic acid, such as maleic acid, fumaric acid, and itaconic acid; alkyl vinyl ether; N-(2-dimethylaminoethyl) methacrylamide or its quaternary compounds, N-vinylimidazole or its quaternary compounds, N-vinylpyrrolidone, N,N-butoxymethyl acrylamide, vinyltrimethoxysilane, vinylmethyldimethoxysilane, vinyldimethylmethoxysilane, and the like.

The EVOH (B) has a melt index (MI; measured at 190° C., under the load of 2160 g) of preferably 0.1 g/10 minutes or more, and more preferably 0.5 g/10 minutes or more. It also has the MI of preferably 100 g/10 minutes or less, more preferably 50 g/10 minutes or less, and most preferably 30 g/10 minutes or less. At this time, from the perspective of dispersibility of the EVOH (B), a ratio [MI (B)/MI (A)] when the MI of the EVOH (B) is MI (B) and the MI (measured at 190° C., under the load of 2160 g) of polyolefin (A) is MI (A) is preferably from 0.1 to 100 and more preferably from 0.3 to 50. It should be noted that, for an MI of those having a melting point around 190° C. or more than 190° C., a value is used that is obtained by measuring at a plurality of temperatures of the melting point or higher under the load of 2160 g and plotting the results with reciprocals of absolute temperatures as abscissa against logarithms of MIs as ordinate in a semi-logarithmic graph for extrapolation to 190° C.

The content of the EVOH (B) is preferably from 0.1 to 30 mass % to a total of the resin mixture. In a case that the content of the EVOH (B) is less than 0.1 mass %, the effect of cost reduction by recovery becomes poor, which is not preferred from the economic perspective. The content is more preferably 1.0 mass % or more. In contrast, in a case that the content of the EVOH (B) is more than 30 mass %, the dispersion of the EVOH (B) in the polyolefin (A) becomes insufficient and there is a risk of not obtaining a sufficient suppressing effect to any of the generation of cords, streaks, and fish-eyes and the screw buildup. The content is more preferably 20 mass % or less.

The acid modified olefin-vinyl carboxylate copolymer (C) used in the present invention is obtained by grafting an acid to an olefin-vinyl carboxylate copolymer.

An olefin monomer to constitute the olefin-vinyl carboxylate copolymer may include ethylene, propylene, n-butylene, isobutylene, and the like, and among them, ethylene is used preferably. A vinyl carboxylate monomer is represented by a general formula $CH_2=CHOCOR$, where R is a linear or branched alkyl group having from 1 to 20 carbon atoms. The vinyl carboxylate monomer may include, for example, vinyl formate, vinyl acetate, vinyl butyrate, vinyl isobutyrate, vinyl versatate, vinyl caproate, vinyl caprylate, vinyl caprate, vinyl laurate, vinyl palmitate, vinyl stearate, vinyl oleate, vinyl pivalate, and the like, and among them, vinyl acetate is most preferably used from the perspective of costs and handling.

As the acid to be grafted to the olefin-vinyl carboxylate copolymer, unsaturated carboxylic acid or a derivative thereof can be used, and it may include, for example, acrylic acid, methacrylic acid, fumaric acid, itaconic acid, and maleic acid; methyl ester or ethyl ester of the above acids; maleic anhydride, itaconic anhydride, and the like. One type of them may be used singly, or two or more types may also be used in combination. Among them, maleic anhydride is used most preferably.

As the acid to be grafted to the olefin-vinyl carboxylate copolymer, it is also possible to use a compound having a boronic acid group or boron-containing groups capable of being converted into a boronic acid group in the presence of water. Here, the boronic acid group is a group represented by the following formula (VI).

[chem. 6]

(VI)

The boron-containing group capable of being converted into a boronic acid group in the presence of water (hereinafter, abbreviated as a boron-containing functional group) indicates a boron-containing group that can be hydrolyzed in the presence of water to be converted into a boronic acid group. More specifically, the above boron-containing group means a functional group capable of being converted into a boronic acid group when being hydrolyzed under conditions of from room temperature to 150° C. for from 10 minutes to 2 hours by use, as a solvent, of water only, a mixture of water and an organic solvent (e.g., toluene, xylene, and acetone), a mixture of a 5% aqueous boric acid solution and the above described organic solvent, or the like. Representative examples of such functional groups may include boronic acid ester groups represented by the following general formula (VII), boronic anhydride groups represented by the following general formula (VIII), and boronic acid salt groups represented by the following general formula (IX):

[chem. 7]

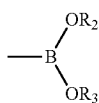

(VII)

[wherein $R_2$ and $R_3$ represent a hydrogen atom, an aliphatic hydrocarbon group (e.g., a linear or branched alkyl or alkenyl group having from 1 to 20 carbon atoms), an alicyclic hydrocarbon group (e.g., a cycloalkyl group and a cycloalkenyl group), or an aromatic hydrocarbon group (e.g., a phenyl group and a biphenyl group), and $R_2$ and $R_3$ may also be a same group or different groups respectively although a case that both $R_2$ and $R_3$ are hydrogen atoms is eliminated. Here, the aliphatic hydrocarbon group, the alicyclic hydrocarbon group, and the aromatic hydrocarbon group may have a substituent, and $R_2$ and $R_3$ may be combined together.]

[chem. 8]

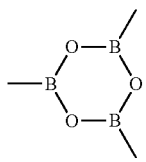

(VIII)

[chem. 9]

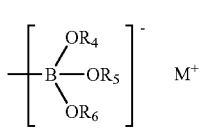

(IX)

[wherein $R_4$, $R_5$ and $R_6$ represent a hydrogen atom, an aliphatic hydrocarbon group, an alicyclic hydrocarbon group, or an aromatic hydrocarbon group like $R_2$ and $R_3$ mentioned above, and $R_4$, $R_5$, and $R_6$ may also be a same group or different groups respectively. M represents alkali metal.]

Specific examples of the boronic acid ester group represented by the general formula (VII) may include boronic acid dimethyl ester group, boronic acid diethyl ester group, boronic acid dipropyl ester group, boronic acid diisopropyl ester group, boronic acid dibutyl ester group, boronic acid dihexyl ester group, boronic acid dicyclohexyl ester group, boronic acid ethylene glycol ester group, boronic acid propylene glycol ester group, boronic acid 1,3-propanediol ester group, boronic acid 1,3-butanediol ester group, boronic acid neopentyl glycol ester group, boronic acid catechol ester group, boronic acid glycerin ester group, boronic acid trimethylolethane ester group, boronic acid trimethylolpropane ester group, boronic acid diethanolamine ester group, and the like.

The boronic acid salt groups represented by the general formula (IX) may be alkali metal salt groups of boronic acid, etc. Specific examples may include sodium boronate group, potassium boronate group, and the like.

Among such boron-containing functional groups, cyclic boronic acid ester groups are preferred in view of thermal stability. Examples of the cyclic boronic acid ester groups may include, for example, 5-membered or 6-membered ring-containing cyclic boronic acid ester groups. Specific examples may include boronic acid ethylene glycol ester group, boronic acid propylene glycol ester group, boronic acid 1,3-propanediol ester group, boronic acid 1,3-butanediol ester group, boronic acid glycerin ester group, and the like.

The acid can be grafted to the olefin-vinyl carboxylate copolymer in a known method, and for example, it is possible to obtain the acid modified olefin-vinyl carboxylate copolymer (C) by adding a radical initiator in a state where the olefin-vinyl carboxylate copolymer is dissolved in an appropriate solvent or melt in an extruder for activation, followed by adding an acid for grafting.

The acid modified olefin-vinyl carboxylate copolymer (C) used in the present invention has an olefin content of from 50 to 95 mol %. In a case of less than 50 mol %, the compatibility with the polyolefin (A) becomes poor and thus fish-eyes become prone to be generated in a molded product. The olefin content is preferably 70 mol % or more, and more preferably 80 mol % or more. In contrast, in a case of more than 95 mol %, reactivity with the EVOH (B) becomes poor and thus the EVOH becomes not easily dispersed uniformly, so that cords or streaks become prone to be generated in a molded product. The olefin content is preferably 93 mol % or less, and even more preferably 91 mol % or less.

The acid modified olefin-vinyl carboxylate copolymer (C) preferably has an amount of acid modification of from 0.01 to 2 mmol/g. In a case of less than 0.01 mmol/g, the reactivity with the EVOH (B) becomes poor and cords or streaks become prone to be generated in a molded product. The amount of acid modification is more preferably 0.02 mmol/g or more, and even more preferably 0.05 mmol/g or more. In contrast, in a case of more than 2 mmol/g, the reactivity with the EVOH (B) becomes excessive, so that fish-eyes become prone to be generated. The amount of acid modification is more preferably 1.9 mmol/g or less, and even more preferably 1.5 mmol/g or less. The amount of acid modification of the present invention means, an amount of acid components calculated by dividing an acid value measured based on JIS K2501 by a molecular weight of potassium hydroxide.

The acid modified olefin-vinyl carboxylate copolymer (C) has a melt index (MI; measured at 190° C., under the load of 2160 g) of preferably 0.03 g/10 minutes or more, and more preferably 0.05 g/10 minutes or more. It is also preferably 100 g/10 minutes or less, more preferably 80 g/10 minutes or less, and even more preferably 70 g/10 minutes or less.

In the present invention, a difference between the ethylene content of the EVOH (B) and the olefin content of the acid modified olefin-vinyl carboxylate copolymer (C) is within a range of from 20 to 70 mol %. In a case of less than 20 mol %, the compatibility of the EVOH (B) and the acid modified olefin-vinyl carboxylate copolymer (C) with the polyolefin (A) becomes poor and thus the effect of improving the compatibility of the polyolefin (A) with the EVOH (B) by the acid modified olefin-vinyl carboxylate copolymer (C) becomes not easily obtained, so that fish-eyes, cords, or streaks become prone to be generated in a molded product. The difference is preferably 30 mol % or more, more preferably 35 mol % or more, and even more preferably 40 mol %. In contrast, in a case of more than 70 mol %, the compatibility of the EVOH (B) with the acid modified olefin-vinyl carboxylate copolymer (C) becomes poor, and in this case as well, the effect of improving the compatibility of the polyolefin (A) with the EVOH (B) by the acid modified olefin-vinyl carboxylate copolymer (C) becomes not easily obtained, so that fish-eyes, cords, or streaks become prone to be generated in a molded product. The difference is preferably 68 mol % or less, and more preferably 65 mol % or less.

In the present invention, a difference between a solubility parameter of the acid modified olefin-vinyl carboxylate copolymer (C) and a solubility parameter of the EVOH (B) is preferably within a range of from 0.5 to 4.0 $(cal/cm^3)^{1/2}$. Here, the solubility parameter in the present invention means a solubility parameter calculated by the formula of Fedors. In a case of the difference between the solubility parameters of less than 0.5 $(cal/cm^3)^{1/2}$, the compatibility of the EVOH (B) with the acid modified olefin-vinyl carboxylate copolymer (C) is good while it turns out to excessively react during the melt molding and thus there is a risk of increasing fish-eyes. The difference is more preferably 0.7 $(cal/cm^3)^{1/2}$ or more, even more preferably 1.0 $(cal/cm^3)^{1/2}$ or more, and particularly preferably 1.2 $(cal/cm^3)^{1/2}$ or more. In contrast, in a case of more than 4.0 $(cal/cm^3)^{1/2}$, the compatibility of the EVOH (B) with the acid modified olefin-vinyl carboxylate copolymer (C) becomes poor, so that fish-eyes, cords, or streaks become prone to be generated in a molded product. The difference is more preferably 3.5 $(cal/cm^3)^{1/2}$ or less, and particularly preferably 3.0 $(cal/cm^3)^{1/2}$.

The content of the acid modified olefin-vinyl carboxylate copolymer (C) is preferably from 0.1 to 30 mass % to the EVOH (B). In a case that the percentage is less than 0.1 mass %, the reactivity with the EVOH (B) becomes poor and thus fish-eyes, cords, or streaks become prone to be generated in a molded product, and further the amount of screw buildup also becomes prone to increase. The percentage is more preferably 1.0 mass % or more, and even more preferably 2.0 mass % or more. In contrast, in a case that the percentage is more than 30 mass %, the reactivity with the EVOH (B) becomes excessive during the melt molding and thus fish-eyes become prone to be generated. The percentage is preferably 28 mass % or less, and even more preferably 25 mass % or less.

In addition, the acid modified olefin-vinyl carboxylate copolymer (C) preferably has a content of from 0.01 to 10 mass % to a total of the resin mixture. In a case of less than 0.01 mass %, the reactivity with the EVOH (B) becomes poor and thus fish-eyes, cords, or streaks become prone to be generated in a molded product, and further the amount of screw buildup also becomes prone to increase. The content is more preferably 0.05 mass % or more, and even more preferably 0.1 mass % or more, to a total of the resin mixture. In contrast, in a case of more than 10 mass %, it becomes not easily dispersed in the polyolefin (A) so that cords or streaks become prone to be generated, and also the reactivity with the EVOH (B) becomes excessive during the melt molding so that fish-eyes become prone to be generated. The content is more preferably 5 mass % or less, and even more preferably 3 mass % or less, to a total of the resin mixture.

The resin mixture of the present invention preferably contains alkali metal. Containing the alkali metal enables to increase the reactivity of the EVOH (B) with the acid modified olefin-vinyl carboxylate copolymer (C) during the melt molding, so that it becomes possible to microdisperse the EVOH (B) in the polyolefin (A). The alkali metal may include lithium, sodium, potassium, rubidium, cesium and francium, and from the perspective of the reactivity and the economic efficiency, sodium and potassium are used preferably.

The molar ratio (content of the alkali metal/amount of acid modification) of a content of the alkali metal to an amount of acid modification in the resin mixture is preferably within a range of from 0.05 to 75. In a case of less than 0.05, there is a case of not obtaining the effect of increasing the reactivity of the EVOH (B) with the acid modified olefin-vinyl carboxylate copolymer (C). The molar ratio is more preferably 0.1 or more, and even more preferably 0.16 or more. In contrast, in a case of more than 75, the EVOH (B) and the acid modified olefin-vinyl carboxylate copolymer (C) turn out to be crosslinked due to an excessive reaction and thus there is a risk of significantly increasing fish-eyes. The ratio is more preferably 50 or less, and even more preferably 10 or less.

The method of containing the alkali metal in the resin mixture is not particularly limited, and it is acceptable to be contained in advance in the polyolefin (A), the EVOH (B), the acid modified olefin-vinyl carboxylate copolymer (C), or another component contained in the resin composition. In addition, it may also be blended by adding a compound containing the alkali metal when obtaining the resin mixture by mixing each component.

As a component to constitute the resin mixture of the present invention, an unmodified olefin-vinyl carboxylate copolymer (D) is preferably blended as well as the polyolefin (A), the EVOH (B), and the acid modified olefin-vinyl carboxylate copolymer (C) that have been mentioned above. Containing the unmodified olefin-vinyl carboxylate copolymer (D) enables to more stabilize the dispersion of the EVOH (B). As the unmodified olefin-vinyl carboxylate copolymer (D) used in the present invention, it is possible to use an olefin-vinyl carboxylate copolymer that is used for the acid modified olefin-vinyl carboxylate copolymer (C).

The unmodified olefin-vinyl carboxylate copolymer (D) preferably has an olefin content of from 50 to 98 mol %. In a case of the olefin content of less than 50 mol %, the compatibility with the polyolefin (A) becomes poor and thus cords and streaks in a molded product are prone to increase. It is more preferably 55 mol % or more, and even more preferably 60 mol % or more. In contrast, in a case of the olefin content of more than 98 mol %, the compatibility of the EVOH (B) and the acid modified olefin-vinyl carboxylate copolymer (C) becomes poor and thus the effect of adding the unmodified olefin-vinyl carboxylate copolymer (D) becomes not easily obtained.

A difference between the olefin content of the unmodified olefin-vinyl carboxylate copolymer (D) and the olefin content of the acid modified olefin-vinyl carboxylate copolymer (C) is preferably within a range of from 0 to 15 mol %. In a case of the difference of more than 15 mol %, the compatibility of the acid modified olefin-vinyl carboxylate (C) with the unmodified olefin-vinyl carboxylate copolymer (D) becomes poor and thus the effect of adding the unmodified olefin-vinyl carboxylate copolymer (D) becomes not easily obtained. The difference is more preferably 10 mol % or less, and even more preferably 7 mol % or less.

The unmodified olefin-vinyl carboxylate copolymer (D) has a melt index (MI; measured at 190° C., under the load of 2160 g) of preferably from 0.1 to 50 g/10 minutes, more preferably from 0.5 to 30 g/10 minutes, and even more preferably from 1 to 20 g/10 minutes.

The content of the unmodified olefin-vinyl carboxylate copolymer (D) is preferably from 0.01 to 20 mass % to a total of the resin mixture. In a case of the content of less than 0.01 mass %, the effect of adding the unmodified olefin-vinyl carboxylate copolymer (D) becomes not easily obtained. The content is more preferably 0.1 mass % or more, and even more preferably 0.2 mass % or more. In contrast, in a case of the content of more than 20 mass %, which turns out to excessively add a component incompatible to the polyolefin (A), cords or streaks become prone to be generated. The content is more preferably 10 mass % or less, and even more preferably 8 mass % or less.

As a component to constitute the resin mixture of the present invention, a lubricant (E) is preferably blended as well as the polyolefin (A), the EVOH (B), and the acid modified olefin-vinyl carboxylate copolymer (C) that have been mentioned above. Containing the lubricant (E) in the resin mixture enables to suppress the amount of screw buildup.

The lubricant (E) used in the present invention may include, for example, fatty acid amides, such as stearic acid amide, oleic acid amide, erucic acid amide, behenic acid amide, ethylenebis(stearic acid amide), methylol stearic acid amide, N-oleyl palmit amide and N-stearyl erucamide; aliphatic hydrocarbon-based lubricants, such as liquid paraffin, natural paraffin, synthetic paraffin and polyethylene wax; and partial oxide, fluoride and chloride thereof; aliphatic alcohols, such as stearyl alcohol and lauryl alcohol; fatty acids, such as stearic acid, lauric acid, myristic acid, behenic acid, and montanoic acid, and metal salt thereof; aliphatic esters, such as stearyl stearate and stearyl laurate; and the like. Among these, preferably metal salt of fatty acid, fatty acid esters, fatty acid amides, and even more preferably fatty acid amides are used.

Containing the metal salt of fatty acid as the lubricant (E) also enables suppression of generating fish-eyes derived from aggregation of a degraded material, so that it is preferred. The metal salt of fatty acid may include metal salt of higher aliphatic acid having a carbon number of from 10 to 26, such as lauric acid, stearic acid, myristic acid, behenic acid, and montanoic acid, particularly a metal salt of Group I, II, or III in the periodic table, which is, for example, a sodium salt, a potassium salt, a calcium salt, and a magnesium salt. It is also possible to use zinc salt or lead salt of the above fatty acids. Among these, a metal salt of Group II in the periodic table, such as calcium salt and magnesium salt, exhibits the effects of the present invention by being added in a small amount. In addition, using metal salt of metal having electronegativity of Allred (A. L. Allred) and Rochow (E. G. Rochow) of 1.5 or more, such as zinc salt and lead salt, enables to suppress screw buildup of a degraded material and enables to reduce a degraded material, such as a scorch and a burnt deposit, in a case of melt extrusion process over a long period of time. It is more effective to use metal salt of Group II in the periodic table and metal salt of the metal having electronegativity of Allred (A. L. Allred) and Rochow (E. G. Rochow) of 1.5 or more in combination.

The content of the lubricant (E) is preferably from 0.005 to 1.0 mass % to a total of the resin mixture. In a case of less than 0.005 mass %, there is a case of not exhibiting the effect of suppressing screw buildup. The content is more preferably 0.01 mass % or more, and even more preferably 0.02 mass % or more. In contrast, in a case of more than 1 mass %, there is a case of increasing the amount of screw buildup. This is considered because the resin composition is plasticized during the melt molding or the lubricant is compatibilized in the resin composition to offset the lubricity with a screw. The content is more preferably 0.9 mass % or less, and even more preferably 0.8 mass % or less.

As a component to constitute of the resin mixture of the present invention, hydrotalcite is preferably blended as well as the polyolefin (A), the EVOH (B), and the acid modified olefin-vinyl carboxylate copolymer (C) that have been mentioned above. Containing the hydrotalcite in the resin mixture enables to suppress the thermal degradation during the melt molding and to reduce a degraded material, such as a scorch and a burnt deposit, in a case of melt extrusion process over a long period of time. The hydrotalcite may preferably include double salt hydrotalcite (G) represented by

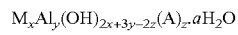
$M_xAl_y(OH)_{2x+3y-2z}(A)_z.aH_2O$ (M denotes one or more of Mg, Ca, Sr, Ba, Zn, Cd, Pb, and Sn, A denotes $CO_3$ or $HPO_4$, x, y, and z are positive numbers, a is 0 or a positive number, and 2x+3y−2z>0).

In the above hydrotalcite, it is preferred that M is Mg, Ca, or Zn, and more preferred that it is a combination of two or more of them. Among these hydrotalcites, examples of particularly preferred ones may be as follows:

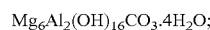
$Mg_6Al_2(OH)_{16}CO_3.4H_2O;$

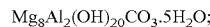
$Mg_8Al_2(OH)_{20}CO_3.5H_2O;$

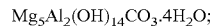
$Mg_5Al_2(OH)_{14}CO_3.4H_2O;$

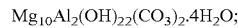
$Mg_{10}Al_2(OH)_{22}(CO_3)_2.4H_2O;$

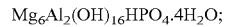
$Mg_6Al_2(OH)_{16}HPO_4.4H_2O;$

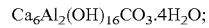
$Ca_6Al_2(OH)_{16}CO_3.4H_2O;$

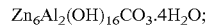
$Zn_6Al_2(OH)_{16}CO_3.4H_2O;$

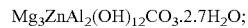
$Mg_3ZnAl_2(OH)_{12}CO_3.2.7H_2O;$

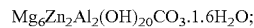
$Mg_6Zn_2Al_2(OH)_{20}CO_3.1.6H_2O;$

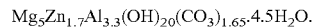
$Mg_5Zn_{1.7}Al_{3.3}(OH)_{20}(CO_3)_{1.65}.4.5H_2O.$

The content of the hydrotalcite is preferably from 0.01 to 2.0 mass % to a total of the resin mixture. In a case of less than 0.01 mass %, the effect of suppressing the thermal degradation during the melt molding is not easily obtained. The content is more preferably 0.02 mass % or more, and even more preferably 0.03 mass % or more. In contrast, in a case of more than 2 mass %, the dispersibility of the hydrotalcite in the polyolefin (A) becomes poor and thus there is a case of increasing fish-eyes. The content is more preferably 1.8 mass % or less, and even more preferably 1.6 mass % or less.

As needed, as a component to constitute the resin mixture of the present invention, it is possible to blend a pigment as well as the polyolefin (A), the EVOH (B), and the acid modified olefin-vinyl carboxylate copolymer (C) that have been mentioned above. The pigment used in the present invention is not particularly limited, and various organic and inorganic pigments are employed in accordance with a color of the intended multilayer structure. The organic pigments may include azo-based pigments, quinacridone-based pigments, and phthalocyanine-based pigments, and one type of these may be used, or two or more types may also be used.

The inorganic pigment may include oxide-based pigments, such as titanium oxide, zinc oxide, and chromium oxide; sulfide-based pigments, such as zinc sulfide, lithopone, cadmium yellow, vermilion, and cadmium red; hydroxide-based pigments, such as alumina hydrate, iron oxide yellow, and viridian; sulfate-based pigments, such as precipitated barium sulfate and barites; carbonate-based pigments, such as calcium carbonate and white lead; phosphate-based pigments, such as manganese violet; carbon black; lead-based pigments; cadmium-based pigments; cobalt-based pigments; iron-based pigments, such as iron black; chromium-based pigments, such as chrome yellow, molybdate orange, zinc chromate, and strontium chromate; ultramarine blue and prussian blue; silicate-based pigments, such as white carbon, clay, and talc, and one type of these may be used, or two or more types may also be used.

Among the above pigments, in views of allowing uniform coloration without unevenness and not easily impairing the thermal stability of the composition, inorganic pigments are preferred and oxide-based pigments are more preferred. Among the oxide-based pigments, from the perspective of food hygiene, titanium oxide (titanium dioxide) and zinc oxide are preferred and titanium oxide (titanium dioxide) is particularly preferred.

The content of the pigment is, although depending on the type of pigment, preferably from 0.0001 to 10 mass % to a total of the resin mixture. In a case of less than 0.0001 mass %, when a melt kneading time of the resin is particularly short, there is a case of generating non-uniformity in the color phase of a molded product due to the dispersion defects. The content is more preferably 0.0005 mass %, and even more preferably 0.001 mass % or more. In contrast, in a case of more than 10 mass %, the pigment aggregates in the polyolefin (A) and thus there is a case of increasing fish-eyes. The content is more preferably 9 mass % or less, and even more preferably 7 mass % or less.

As long as not inhibiting the effects of the present invention, as a component to constitute the resin mixture of the present invention, it is also preferred to blend a partially saponified ethylene-vinyl acetate copolymer (hereinafter, may be referred to as an S-EVOH) as well as the polyolefin (A), the EVOH (B), and the acid modified olefin-vinyl carboxylate copolymer. The S-EVOH is a saponified ethylene-vinyl acetate copolymer having an ethylene content of from 68 to 98 mol % and having vinyl acetate units with a degree of saponification of 20% or more. The S-EVOH preferably has an ethylene content of 70 mol % or more, and more preferably 72 mol % or more. Meanwhile, the ethylene content is preferably 96 mol % or less and more preferably 94 mol % or less. The vinyl acetate units more preferably have a degree of saponification of 30% or more and even more preferably 40% or more. An upper limit of the degree of saponification is not particularly limited and may also be 99 mol % or more, and it is also possible to use one substantially having a degree of saponification of approximately 100%. In a case that the ethylene content is less than 68 mol % or more than 98 mol %, or the vinyl acetate units have a degree of saponification of less than 20%, the effect of improving the compatibility of the polyolefin (A) with the EVOH (B) becomes insufficient.

The S-EVOH has a melt index (measured at 190° C., under the load of 2160 g) of preferably 0.1 g/10 minutes or more, more preferably 0.5 g/10 minutes or more, and even more preferably 1 g/10 minutes or more. Meanwhile, the S-EVOH has the melt index of preferably 100 g/10 minutes or less, more preferably 50 g/10 minutes or less, and even more preferably 30 g/10 minutes or less.

The content of the S-EVOH is preferably from 0.01 to 2 mass % to a total of the resin mixture. In a case of less than 0.01 mass %, there is a case that the effect of improving the compatibility of the polyolefin (A) with the EVOH (B). The content is more preferably 0.02 mass % and even more preferably 0.004 mass % or more. In contrast, in a case of more than 2 mass %, it turns out to excessively react with acid modified polyolefin contained in the acid modified olefin-vinyl carboxylate copolymer (C) and the adhesive resin during the melt molding and thus there is a case of increasing fish-eyes. The content is more preferably 1.8 mass % or less, and even more preferably 1.6 mass % or less.

As long as not inhibiting the effects of the present invention, as a component to constitute the resin mixture of the present invention, it is also preferred to blend an antioxidant as well as the polyolefin (A), the EVOH (B), and the acid modified olefin-vinyl carboxylate copolymer (C) that have been mentioned above. Adding the antioxidant enables to suppress yellowing of a molded product after melt molding. The antioxidant may include, for example, 2,5-di-t-butylhydroquinone, 2,6-di-t-butyl-p-cresol, 4,4'-thiobis(6-t-butylphenol), 2,2'-methylenebis(4-methyl-6-t-butylphenol), octadecyl-3-(3',5'-di-t-butyl-4'-hydroxyphenyl)propionate, 4,4'-thiobis(6-t-butylphenol), and the like.

The content of the antioxidant is preferably from 0.0001 to 2 mass % to a total of the resin mixture. In a case of less than 0.0001 mass %, the effect of improving the thermal degradation during the melt molding is insufficient. The content is more preferably 0.0002 mass % or more, and even more preferably 0.0004 mass % or more. In contrast, in a case of more than 2 mass %, there is a case of decreasing the adhesion to an adjacent layer when producing a multilayer structure having a layer obtained by melt molding the resin mixture. The content is preferably 1.8 mass % or less, and even more preferably 1.6 mass % or less.

It is also possible to blend other additives into the resin mixture of the present invention as long as not inhibiting the effects of the present invention. Examples of such an additive may include an ultraviolet absorber, a plasticizer, an antistatic, a filler, and other polymer compounds. Specific examples of the additives may include the following. The content of the additives is preferably 30 mass % or less, and more preferably 10 mass % or less, to a total of the resin mixture.

Ultraviolet Absorber: ethylene-2-cyano-3,3'-diphenylacrylate, 2-(2'-hydroxy-5'-methylphenyl)benzotriazole, 2-(2'-hydroxy-3'-t-butyl-5'-methylphenyl)-5-chlorobenzotriazole, 2-hydroxy-4-methoxybenzophenone, 2,2'-dihydroxy-4-methoxybenzophenone, 2-hydroxy-4-octoxybenzophenone, and the like.

Plasticizer: dimethyl phthalate, diethyl phthalate, dioctyl phthalate, wax, liquid paraffin, phosphate ester, and the like.

Antistatic: pentaerythritol monostearate, sorbitan monopalmitate, sulfated polyolefins, polyethylene oxide, carbowax, and the like.

Filler: glass fibers, asbestos, ballastnite, calcium silicate, and the like.

In addition, many other polymer compounds can also be blended into the resin mixture of the present invention as long as not inhibiting the actions and the effects of the present invention.

Next, a description is given to a method of obtaining the resin mixture of the present invention by mixing the polyolefin (A), the EVOH (B), and the acid modified olefin-vinyl carboxylate copolymer (C), and a method of molding the resin mixture.

A mixing method to obtain the resin mixture of the present invention is not particularly limited, and may include: a method comprising mixing the polyolefin (A), the EVOH (B), and the acid modified olefin-vinyl carboxylate copolymer (C) in one time; a method comprising mixing a portion of the polyolefin (A), the EVOH (B), and the acid modified olefin-vinyl carboxylate copolymer (C) in advance, followed by blending other components thereinto and mixing; and a method comprising mixing after blending a multilayer structure containing a portion of the polyolefin (A), the EVOH (B), and the acid modified olefin-vinyl carboxylate copolymer (C) into other components.

Among all, a method of mixing scrap of collected offcuts and defective products generated when obtaining a molded product of a multilayer structure, containing the polyolefin (A) and the EVOH (B) with a resin composition containing the acid modified olefin-vinyl carboxylate copolymer (C) is preferred. The additive blended when melt kneading collected scrap is referred to as a recycling agent, and here, the acid modified olefin-vinyl carboxylate copolymer (C) is used as the recycling agent. At this time, in a case of adding another component to the acid modified olefin-vinyl carboxylate copolymer (C), it is preferred that they are melt kneaded in advance to make up a resin composition containing all of them, followed by adding it to the scrap. It is preferred that such recycling agent is blended into the scrap in the form of pellets. It is preferred that the scrap is preground into an appropriate size, and it is a preferred method of producing a resin mixture of the present invention to mix the recycling agent in the form of pellets with the ground scrap. As the scrap, scrap obtained from one molded product may be used and related scrap obtained from two or more molded products may also be used by mixing them.

A particularly preferred embodiment is a method comprising mixing a recovery of a multilayer structure, including a layer of a resin composition containing the polyolefin (A) and a layer of the EVOH (B), and a recycling agent of a resin composition containing the acid modified olefin-vinyl carboxylate copolymer (C).

Further, the scrap as a raw material for the resin composition of the present invention may also be made of a multilayer structure including a recovery layer. That is, a molded product of a multilayer structure including a recovery layer obtained by melt molding a resin mixture obtained from a recovery may be produced and a scrap recovery of the molded product may also be used again as a raw material for a recovery layer in a similar multilayer structure.

When the resin mixture of the present invention contains components other than the polyolefin (A), the EVOH (B), and the acid modified olefin-vinyl carboxylate copolymer (C), a method of blending those components is not particularly limited and they can be blended in operations similar to each component of the (A), (B), and (C) described above. Among all, when the resin mixture of the present invention contains the unmodified olefin-vinyl carboxylate copolymer (D), it is preferred to add to the acid modified olefin-vinyl carboxylate copolymer (C) to use as the recycling agent. Also in a case that the resin mixture of the present invention contains the lubricant, the hydrotalcite, and the antioxidant, it is preferred to add to the acid modified olefin-vinyl carboxylate copolymer (C) to use as the recycling agent. For a method of producing such recycling agent, similar methods as above are employed.

In a case that the lubricant, the hydrotalcite, the antioxidant, and the pigment are contained in the resin mixture of the present invention, it may be contained in the polyolefin (A) or the EVOH (B) in advance and may also be added to the acid modified olefin-vinyl carboxylate copolymer (C) to use as the recycling agent. Alternatively, it can also be blended when producing the resin mixture. From the perspective of suppressing generation of a degraded material, such as a scorch and a burnt deposit, occurring when melt extrusion processing the resin mixture of the present invention over a long period of time, in particular, a scorch and a burnt deposit caused by deterioration of the EVOH (B), it is preferred to contain the lubricant in the EVOH (B) in advance.

As a method of mixing each component, a known mixing device, such as a rocking mixer, a ribbon blender, a super mixer, and a line mixer, can be used. A molded product can be obtained by directly supplying the resin mixture thus obtained to a molding machine, and a molded product can also be obtained by melt kneading at normally from 150 to 300° C. using an extruder in advance for repelletization, followed by supplying such pellets to a molding machine. Direct supply of the resin mixture to a molding machine without repelletization is preferred because it is excellent in the moldability and the color phase of a molded product, and also is advantageous from the perspective of the productivity and the economic efficiency. It is also possible to further mix an appropriate amount of an olefin-based polymer in the resin mixture, followed by being supplied to a molding machine.

The resin mixture of the present invention can be molded into any molded product, such as a film, a sheet, a tube, a bottle, and a cup using a melt extrusion molding machine, a compression molding machine, a transfer molding machine, an injection molding machine, a blow molding machine, a thermoforming machine, a rotational molding machine, a dip molding machine, or the like that is well known. An extrusion temperature while molding is appropriately selected depending on the type of the polyolefin (A) constituting the resin mixture of the present invention, the melt indexes of the polyolefin (A) and the EVOH (B), the composition ratio of the polyolefin (A) and the EVOH (B), the type of the molding machine, or the like, while it is in a range of from 170 to 350° C. in many cases.

A preferred embodiment of the present invention is a multilayer structure having a layer obtained by melt molding the above resin mixture, and more preferably, a multilayer structure including at least two layers of a layer obtained by melt molding the above resin mixture and a layer of the EVOH (B). Appropriate examples of the layer constitution are expressed, for example, as the following layer constitutions while indicating the resin mixture of the present invention as c, the polyolefin as a, the EVOH as b, and the adhesive resin as ad. Here, as the ad, it is possible to preferably use a modified polyolefin resin modified with unsaturated carboxylic acid or a derivative thereof.

| Three Layers | c/ad/b |
| Four Layers | a/c/ad/b |
| Five Layers | c/ad/b/ad/c, a/ad/b/ad/c |
| Six Layers | a/c/ad/b/ad/a, c/a/ad/b/ad/a, c/a/ad/b/ad/c, a/c/ad/b/ad/c |
| Seven Layers | a/c/ad/b/ad/c/a |

It is also possible to obtain the resin mixture of the present invention from scrap of such multilayer structure. Accordingly, in a case that there is an ad layer in the multilayer structure, it is considered that an adhesive resin (ad) is contained in the resin mixture of the present invention as a component.

As a method of producing the multilayer structure, a method comprising performing so-called coextrusion molding is preferred to use a number of extruders corresponding to the types of resin layer for simultaneous extrusion molding of flows of the resins melt in the extruders in a state of laminated layers. As another method, it is also possible to employ a molding method, such as extrusion coating and dry lamination. In addition, stretching, such as uniaxial stretching, biaxial stretching, or blow stretching, of a single-layer molded product of the resin mixture of the present invention or a multilayer structure including a layer obtained by melt molding the resin mixture of the present invention is performed, thereby enabling to obtain a molded product excellent in mechanical properties, gas barrier properties, and the like.

Since the multilayer structure having the above layer constitutions contains the EVOH excellent in gas barrier properties, it is useful as a packaging material for foods, medicine, medical devices requiring the gas barrier properties.

Since the resin mixture of the present invention has the EVOH with high dispersibility during the melt molding, it is possible to obtain a molded product having a less amount of screw buildup of a degraded material and having less generation of fish-eyes, cords, and streaks even in continuous melt molding over a long period of time. Since it is excellent in the mechanical properties and the gas barrier properties and a molded product with a good appearance is obtained, its industrial significance is great.

EXAMPLES

In present Examples, the following raw materials were used.

<Polyolefin (A)>
A-1: "NOVATEC PP EA7A" produced by Japan Polypropylene Corporation, polypropylene [density of 0.90 g/cm$^3$, melt index of 1.4 g/10 minutes (ASTM-D 1238, 230° C., load of 2160 g)]

<EVOH (B)>
B-1: EVOH [ethylene content of 32 mol %, degree of saponification of 99.7%, density of 1.19 g/cm$^3$, melt index of 1.6 g/10 minutes (ASTM-D 1238, 190° C., load of 2160 g), solubility parameter of 12.3 (cal/cm$^3$)$^{1/2}$, amount of terminal carboxylic acid and lactone ring of 0.07 mol %]
B-2: EVOH [ethylene content of 27 mol %, degree of saponification of 99.8%, density of 1.20 g/cm$^3$, melt index of 1.7 g/10 minutes (ASTM-D 1238, 190° C., load of 2160 g), solubility parameter of 12.6 (cal/cm$^3$)$^{1/2}$, amount of terminal carboxylic acid and lactone ring of 0.06 mol %]
B-3: EVOH [ethylene content of 44 mol %, degree of saponification of 99.7%, density of 1.14 g/cm$^3$, melt index of 1.7 g/10 minutes (ASTM-D 1238, 190° C., load of 2160 g), solubility parameter of 11.58 (cal/cm$^3$)$^{1/2}$, amount of terminal carboxylic acid and lactone ring of 0.09 mol %]
B-4: EVOH [ethylene content of 32 mol %, degree of saponification of 99.7%, density of 1.19 g/cm$^3$, melt index of 1.5 g/10 minutes (ASTM-D 1238, 190° C., load of 2160 g), solubility parameter of 12.3 (cal/cm$^3$)$^{1/2}$, amount of terminal carboxylic acid and lactone ring of 0.02 mol %]
B-5: EVOH [ethylene content of 19 mol %, degree of saponification of 99.8%, density of 1.24 g/cm$^3$, melt index of 1.8 g/10 minutes (ASTM-D 1238, 190° C., load of 2160 g), solubility parameter of 13.07 (cal/cm$^3$)$^{1/2}$, amount of terminal carboxylic acid and lactone ring of 0.09 mol %]
B-6: EVOH [ethylene content of 61 mol %, degree of saponification of 99.7%, density of 1.07 g/cm$^3$, melt index of 2.9 g/10 minutes (ASTM-D 1238, 190° C., load of 2160 g), solubility parameter of 10.5 (cal/cm$^3$)$^{1/2}$, amount of terminal carboxylic acid and lactone ring of 0.09 mol %]

<Acid Modified Olefin-Vinyl Carboxylate Copolymer (C)>
C-1: maleic anhydride modified ethylene-vinyl acetate copolymer [olefin content of 89 mol %, amount of acid modification of 0.18 mmol/g, density of 0.95 g/cm$^3$, melt index of 16.0 g/10 minutes (ASTM-D 1238, 190°, load of 2160 g), solubility parameter of 9.8 (cal/cm$^3$)$^{1/2}$]
C-2: maleic anhydride modified ethylene-vinyl acetate copolymer [olefin content of 93 mol %, amount of acid modification of 0.18 mmol/g, density of 0.94 g/cm$^3$, melt index of 15.7 g/10 minutes (ASTM-D 1238, 190° C., load of 2160 g), solubility parameter of 9.41 (cal/cm$^3$)$^{1/2}$]
C-3: maleic anhydride modified ethylene-vinyl acetate copolymer [olefin content of 82 mol %, amount of acid modification of 0.18 mmol/g, density of 0.97 g/cm$^3$, melt index of 15.0 g/10 minutes (ASTM-D 1238, 190° C., load of 2160 g), solubility parameter of 9.41 (cal/cm$^3$)$^{1/2}$]
C-4: maleic anhydride modified ethylene-vinyl acetate copolymer [olefin content of 78 mol %, amount of acid modification of 0.18 mmol/g, density of 0.98 g/cm$^3$, melt index of 14.5 g/10 minutes (ASTM-D 1238, 190° C., load of 2160 g), solubility parameter of 10.63 (cal/cm$^3$)$^{1/2}$]
C-5: maleic anhydride modified ethylene-vinyl acetate copolymer [olefin content of 89 mol %, amount of acid modification of 0.33 mmol/g, density of 0.95 g/cm$^3$, melt index of 18.2 g/10 minutes (ASTM-D 1238, 190° C., load of 2160 g), solubility parameter of 10.26 (cal/cm$^3$)$^{1/2}$]
C-6: maleic anhydride modified ethylene-vinyl acetate copolymer [olefin content of 89 mol %, amount of acid modification of 0.03 mmol/g, density of 0.95 g/cm$^3$, melt index of 14.0 g/10 minutes (ASTM-D 1238, 190° C., load of 2160 g), solubility parameter of 9.04 (cal/cm$^3$)$^{1/2}$]
C-7: maleic anhydride modified ethylene-vinyl acetate copolymer [olefin content of 96 mol %, amount of acid modification of 0.18 mmol/g, density of 0.93 g/cm$^3$, melt index of 12.4 g/10 minutes (ASTM-D 1238, 190° C., load of 2160 g), solubility parameter of 9.09 (cal/cm$^3$)$^{1/2}$]
EVAc: ethylene-vinyl acetate copolymer [olefin content of 89 mol %, density of 0.96 g/cm$^3$, melt index of 12.4 g/10 minutes (ASTM-D 1238, 190° C., load of 2160 g), solubility parameter of 8.84 (cal/cm$^3$)$^{1/2}$]
Acid Modified PE: maleic anhydride modified high density polyethylene [amount of acid modification of 0.18 mmol/g, density of 0.95 g/cm$^3$, melt index of 12.3 g/10 minutes (ASTM-D 1238, 190° C., load of 2160 g), solubility parameter of 7.96 (cal/cm$^3$)$^{1/2}$]

<Unmodified Olefin-Vinyl Carboxylate Copolymer (D)>
D-1: "EVAFLEX EV260" produced by Du Pont-Mitsui Polychemicals Co., Ltd., ethylene-vinyl acetate copolymer [olefin content of 89 mol %, melt index of 6.0 g/10 minutes (ASTM-D 1238, 190° C., load of 2160 g)]
D-2: "EVAFLEX P1107" produced by Du Pont-Mitsui Polychemicals Co., Ltd., ethylene-vinyl acetate copolymer [olefin content of 97 mol %, melt index of 9.0 g/10 minutes (ASTM-D 1238, 190° C., load of 2160 g)]
D-3: "EVAFLEX EV40LX" produced by Du Pont-Mitsui Polychemicals Co., Ltd., ethylene-vinyl acetate copolymer [olefin content of 82 mol %, melt index of 2.0 g/10 minutes (ASTM-D 1238, 190° C., load of 2160 g)]

<Lubricant (E)>
E-1: stearic acid amide
E-2: ethylenebis(stearic acid amide)
E-3: calcium stearate <Others>
Adhesive Resin: "MODIC AP P604V" produced by Mitsubishi Chemical Corporation, brand for polypropylene, [density of 0.90 g/cm$^3$, melt index of 3.2 g/10 minutes (ASTM-D 1238, 230° C., load of 2160 g)]

Pigment: "EPONY L-11268 MPT" produced by DIC Corporation, white inorganic pigment, derived from TiO$_2$ Measurement and evaluation of the respective properties were carried out in the following methods, respectively.

[Determination of Primary Structure of EVOH (B) (NMR Method)]

Measurement Conditions

Name of Apparatus: superconducting nuclear magnetic resonance apparatus Lambda 500, manufactured by JEOL Ltd.

Observation Frequency: 500 MHz ($^1$H)

Solvent: DMSO-d6, water/methanol (4/6)

Polymer Concentration: 4 wt %

Measurement Temperatures: 95° C., 40° C.

Accumulation Number: 600 times

Pulse Repeat Time: 4 seconds

Sample Rotation Rate: from 10 to 12 Hz (1) Measurement of Amount of Terminal Carboxylic Acid and Lactone Ring The ratio ((I+II)/(III+IV+V), amount of terminal carboxylic acid and lactone ring) of a total of carboxylic acids units (I) and lactone ring units (II) in a polymer terminal to a total of ethylene units (III), vinyl alcohol units (IV), and vinyl ester units (V) was calculated using H-NMR measurement (water/methanol solvent, measured at 80° C.) (the chemical shift value was based on TMS peak of 0 ppm). As illustrated in a chart of FIG. 1, using an integrated value ($I_1$) of methylene hydrogens at from 0.7 to 2.0 ppm, an integrated value ($I_2$) at a peak of from 2.2 to 2.5 ppm, and an integrated value ($I_3$) at a peak of from 2.5 to 2.65 ppm, calculation of the amount of terminal carboxylic acid and lactone ring was carried out by the following formula 1. Et in the following formula denotes the ethylene content.

$$\text{Amount of terminal carboxylic acid and lactone ring (mol \%)} = \frac{(Et + 100)(2I_2 + I_3)}{200I_1 + (2I_2 + I_3)/2} \times 100 \quad \text{(Formula 1)}$$

In FIG. 1, the integrated value ($I_1$) is derived from all hydrogens in CH$_2$ units contained in ethylene units (III), vinyl alcohol units (IV), and vinyl ester units (V). The integrated value ($I_2$) is derived from hydrogens in CH$_2$ units adjacent to a carboxyl group in terminal carboxylic acids units (I). The integrated value ($I_3$) is derived from hydrogens in CH$_2$ units adjacent to a carbonyl group in terminal lactone ring units (II).

(2) Measurement of Ethylene Content

The ethylene content was calculated using H-NMR measurement (DMSO solvent, measured at 40° C. and 95° C.) (the chemical shift value was based on solvent peak of 2.5 ppm). As illustrated in charts of FIGS. 2 and 3, based on the integrated values ($I_1$) and ($I_3$) of methylene hydrogens at from 0.7 to 1.8 ppm, the respective integrated values were obtained. Using the integrated values ($I_1$), ($I_2$), ($I_3$), ($I_4$), ($I_5$), and ($I_6$) in FIGS. 2 and 3, calculation of an ethylene content was carried out by the following formula 2.

$$\text{Ethylene content (mol \%)} = \frac{3I_1I_3 - 2I_1(3I_4 + I_6) - 6I_2I_3}{3I_1I_3 + 2I_1(3I_4 + I_6) + 6I_2I_3} \times 100 \quad \text{(Formula 2)}$$

In FIGS. 2 and 3, the integrated values ($I_1$) and ($I_3$) are derived from hydrogen same as that of the integrated value ($I_1$) in FIG. 1, the integrated value ($I_2$) is derived from methine hydrogens in vinyl alcohol units (IV) (methine hydrogens in the units having both sides adjacent to vinyl alcohol), the integrated value ($I_4$) is derived from methine hydrogens in vinyl alcohol units (IV) (methine hydrogens in a case of being in the units having both sides adjacent to ethylene and in a case of being sandwiched by ethylene-vinyl alcohol), the integrated value ($I_5$) is derived from methine hydrogens in 1,2-glycol structure, the integrated value ($I_6$) is derived from hydrogen of methyl groups equivalent to $R_1$ in vinyl ester units (V), and the integrated value ($I_7$) is derived from hydrogen of methyl groups in —CH$_2$CH$_3$ groups at an EVOH terminal.

[Determination of Amount of Acid Modification]

Based on JIS K2501, acid values of the acid modified olefin-vinyl carboxylate copolymer (C) and each component blended into resin mixtures obtained in the following Examples and Comparative Examples were measured to calculate the amounts of acid modification (mmol/g) from the acid values. The amount of acid modification of the resin mixture was calculated by summing up the amount of acid modification of each component.

[Determination of Content of Alkali Metal]

The resin mixtures obtained in the following Examples and Comparative Examples were ground by frost shattering. To 0.15 g of powder thus obtained, 3 mL of 65 mass % sulfuric acid and 3 mL of 97 mass % sulfuric acid were added and the resin was digested in a wet digestion system (Speedwave (MWS-2 manufactured by Actac Co., Ltd.). After a digestion liquid thus obtained passed through a filter of 0.45 µm, it was diluted in a measuring flask with ion exchange water to 100 times, followed by quantitative analysis at each observation wavelength (Na: 589.592 nm, K: 766.490 nm) using an ICP emission spectrophotometer "Optima 4300 DV" manufactured by PerkinElmer Japan Co., Ltd. to determine the amount of alkali metal ions.

[Evaluation of Screw Buildup Amount]

Using an extruder, after melt kneading 20 kg of the resin mixtures obtained in the following Examples and Comparative Examples, an operation of melt kneading the pellets thus obtained again was repeated for melt kneading five times in total. Then, after melt kneading 2 kg of low density polyethylene, 2 kg of high density polyethylene was further melt kneaded until the high density polyethylene did not come out of the extruder. Next, the screw was removed and a substance stuck to the screw was taken for weighing. The amount of screw buildup is preferably 3000 mg or less, and more preferably 2000 mg or less. The used extruder and the melt kneading conditions are as follows.

Extruder: twin screw extruder "LABO PLASTOMILL" manufactured by Toyo Seiki Seisaku-Sho, Ltd.

Screw diameter: 25 mmϕ

Screw Rotation Speed: 100 rpm

Feeder Rotation Speed: 100 rpm

Cylinder and Die Temperature Settings: C1/C2/C3/C4/C5/D=180° C./210° C./230° C./230° C./230° C./230° C.

[Evaluation of Cord and Streak]

In the evaluation of the amount of screw buildup, using the pellets obtained by melt kneading five times, a single layer film having a thickness of 60μ was prepared at an extrusion temperature of 230° C. and at a cooling temperature of 80° C. using a single screw extruder of 20 mmϕ (LABO PLASTOMILL manufactured by Toyo Seiki Seisaku-Sho, Ltd.) with a flexible die of 300 mm in width mounted thereto.

The single layer film thus obtained was visually evaluated into the following four stages.
A: Almost no cord and non-uniformity in thickness.
B: Cords and non-uniformity in thickness found in places.
C: Many cords and non-uniformity in thickness found.
D: Hole penetrated through.

[Evaluation of Fish-Eye]

Placing the middle of the single layer film obtained by the evaluation of cords and streaks as a center, a frame was outlined with lines in areas separated by 5 cm from each other in MD and TD directions, respectively, vertical to the respective MD and TD directions, and a 10 cm×10 cm square sample was cut out. Subsequently, the sample thus cut out was lit by a fluorescent light to visually count the number of fish-eyes. The number of fish-eyes is preferably 200 or less, and more preferably 150 or less.

Example 1

[Production of Recovery]

Using A-1 as the polyolefin (A) for outermost layers, B-1 as the EVOH (B) for an innermost layer, "MODIC AP P604V" as the adhesive resin layers, three-type five-layer coextrusion of polyolefin layer/adhesive resin layer/EVOH layer/adhesive resin layer/polyolefin layer=200μ/20μ/20μ/20μ/200μ was carried out with a feedblock die to prepare a multilayered film. The respective resins were supplied to the feedblock using a 32 mmϕ extruder for the polyolefin layers, a 25 mmϕ extruder for the adhesive resin layers, and a 20 mmϕ extruder for the EVOH layer, respectively, and it was carried out at the temperature for extrusion at 220° C. for each resin, and also at 220° C. in a die section and a feedblock section.

Subsequently, the multilayered film thus obtained was ground with a grinder of 8 mmϕ diameter meshes to obtain a recovery. A recovery thus obtained had a mass ratio of polyolefin (A-1)/EVOH (B-1)/adhesive resin=85.9/5.5/8.6.

Using C-1 as the acid modified olefin-vinyl carboxylate copolymer (C), the recovery thus obtained, C-1, and the pigment, they were dry blended at a mass ratio of recovery/C-1/pigment=100/0.45/0.3 to obtain a resin mixture. Using the resin mixture thus obtained, the respective evaluation was carried out in the above method. Results are shown in Table 1 in collection.

Examples 2 Through 11

In a same manner as Example 1 other than using EVOHs and copolymers described in Table 1 respectively as the EVOH (B) and the acid modified olefin-vinyl carboxylate copolymer (C), a resin mixture was obtained, and the respective evaluation was carried out using the resin mixture thus obtained. Results are shown in Table 1 in collection.

Comparative Example 1

In a same manner as Example 1 other than not blending the acid modified olefin-vinyl carboxylate copolymer (C), a resin mixture was obtained, and the respective evaluation was carried out using the resin mixture thus obtained. Results are shown in Table 1 in collection.

Comparative Examples 2 Through 4

In a same manner as Example 1 other than using EVOHs and copolymers described in Table 1 respectively as the EVOH (B) and the acid modified olefin-vinyl carboxylate copolymer (C), a resin mixture was obtained, and the respective evaluation was carried out using the resin mixture thus obtained. Results are shown in Table 1 in collection.

Comparative Example 5

In a same manner as Example 1 other than using EVAc instead of C-1, a resin mixture was obtained, and the respective evaluation was carried out using the resin mixture thus obtained. Results are shown in Table 1 in collection.

Comparative Example 6

In a same manner as Example 1 other than using acid modified PE instead of C-1, a resin mixture was obtained, and the respective evaluation was carried out using the resin mixture thus obtained. Results are shown in Table 1 in collection.

TABLE 1

|  | Example 1 | Example 2 | Example 3 | Example 4 | Example 5 | Example 6 | Example 7 | Example 8 | Example 9 |
|---|---|---|---|---|---|---|---|---|---|
| Type of EVOH (B) | B-1 | B-1 | B-1 | B-2 | B-2 | B-3 | B-1 | B-1 | B-2 |
| Ethylene Content (mol %) | 32 | 32 | 32 | 27 | 27 | 44 | 32 | 32 | 27 |
| Amount of Terminal Carboxylic Acid and Lactone Ring (mol %) | 0.07 | 0.07 | 0.07 | 0.06 | 0.06 | 0.09 | 0.07 | 0.07 | 0.06 |
| Type of Acid Modified Olefin-Vinyl Carboxylate Copolymer (C) | C-1 | C-2 | C-3 | C-4 | C-2 | C-3 | C-5 | C-6 | C-1 |
| Olefin Content (mol %) | 89 | 93 | 82 | 78 | 93 | 82 | 89 | 89 | 89 |
| Amount of Acid Modification (mmol/g) | 0.18 | 0.18 | 0.18 | 0.18 | 0.18 | 0.18 | 0.33 | 0.03 | 0.18 |
| Difference between Olefin Contents (mol %) | 57 | 61 | 50 | 51 | 66 | 38 | 57 | 57 | 62 |

TABLE 1-continued

|  | | | | | | | | |
|---|---|---|---|---|---|---|---|---|
| Difference between Solubility Parameters ($(cal/cm^3)^{1/2}$) Resin Mixture (parts by mass) | 2.50 | 2.89 | 1.75 | 1.97 | 3.19 | 1.03 | 2.04 | 3.26 | 2.80 |
| Polyolefin (A) | 85.9 | 85.9 | 85.9 | 85.7 | 85.7 | 86.0 | 85.9 | 85.9 | 85.7 |
| EVOH (B) | 5.5 | 5.5 | 5.5 | 5.7 | 5.7 | 5.4 | 5.5 | 5.5 | 5.7 |
| Adhesive Resin | 8.6 | 8.6 | 8.6 | 8.6 | 8.6 | 8.6 | 8.6 | 8.6 | 8.6 |
| Acid Modified Olefin-Vinyl Carboxylate Copolymer (C) | 0.45 | 0.45 | 0.45 | 0.45 | 0.45 | 0.45 | 0.45 | 0.45 | 0.45 |
| Pigment Composition Ratio (mass %) | 0.3 | 0.3 | 0.3 | 0.3 | 0.3 | 0.3 | 0.3 | 0.3 | 0.3 |
| (C/B) | 8.2 | 8.2 | 8.2 | 7.9 | 7.9 | 8.3 | 8.2 | 8.2 | 7.9 |
| (B/Total Amount of Resin Composition) | 5.5 | 5.5 | 5.5 | 5.7 | 5.7 | 5.4 | 5.5 | 5.5 | 5.7 |
| Alkali Metal/Amount of Acid Modification (molar ratio) Evaluation Results | 0.52 | 0.52 | 0.52 | 0.52 | 0.52 | 0.52 | 0.33 | 1.34 | 0.52 |
| Amount of Screw Buildup (mg) | 1620 | 1460 | 1848 | 1812 | 1634 | 1777 | 1612 | 1634 | 1601 |
| Cords and Streaks | A | A | A | B | B | B | A | B | A |
| Fish-eyes (number) | 92 | 103 | 102 | 110 | 119 | 127 | 168 | 117 | 93 |

|  | Example 10 | Example 11 | Comparative Example 1 | Comparative Example 2 | Comparative Example 3 | Comparative Example 4 | Comparative Example 5 | Comparative Example 6 |
|---|---|---|---|---|---|---|---|---|
| Type of EVOH (B) | B-3 | B-4 | B-1 | B-1 | B-5 | B-6 | B-1 | B-1 |
| Ethylene Content (mol %) | 44 | 32 | 32 | 32 | 19 | 61 | 32 | 32 |
| Amount of Terminal Carboxylic Acid and Lactone Ring (mol %) | 0.09 | 0.02 | 0.07 | 0.07 | 0.09 | 0.09 | 0.07 | 0.07 |
| Type of Acid Modified Olefin-Vinyl Carboxylate Copolymer (C) | C-1 | C-1 | none | C-7 | C-2 | C-4 | EVAc | acid modified PE |
| Olefin Content (mol %) | 89 | 89 | — | 96 | 93 | 78 | 89 | 100 |
| Amount of Acid Modification (mmol/g) | 0.18 | 0.18 | — | 0.18 | 0.18 | 0.18 | — | 0.18 |
| Difference between Olefin Contents (mol %) | 45 | 57 | — | 64 | 74 | 17 | 57 | 68 |
| Difference between Solubility Parameters ($(cal/cm^3)^{1/2}$) Resin Mixture (parts by mass) | 1.78 | 2.50 | — | 3.21 | 3.66 | 0.13 | 3.46 | 4.34 |
| Polyolefin (A) | 86.0 | 85.9 | 85.9 | 85.9 | 85.6 | 86.2 | 85.9 | 85.9 |
| EVOH (B) | 5.4 | 5.5 | 5.5 | 5.5 | 5.9 | 5.1 | 5.5 | 5.5 |
| Adhesive Resin | 8.6 | 8.6 | 8.6 | 8.6 | 8.6 | 8.6 | 8.6 | 8.6 |
| Acid Modified Olefin-Vinyl Carboxylate Copolymer (C) | 0.45 | 0.45 | 0 | 0.45 | 0.45 | 0.45 | 0 | 0 |
| Pigment Composition Ratio (mass %) | 0.3 | 0.3 | 0.3 | 0.3 | 0.3 | 0.3 | 0.3 | 0.3 |
| (C/B) | 8.3 | 8.2 | 0.0 | 8.2 | 7.6 | 8.8 | 0.0 | 0.0 |
| (B/Total Amount of Resin Composition) | 5.4 | 5.5 | 5.5 | 5.5 | 5.9 | 5.1 | 5.5 | 5.5 |
| Alkali Metal/Amount of Acid Modification (molar ratio) Evaluation Results | 0.52 | 0.52 | 2.03 | 0.52 | 0.52 | 0.52 | 2.03 | 0.52 |
| Amount of Screw Buildup (mg) | 1637 | 2112 | 5921 | 2444 | 3021 | 2022 | 1544 | 4711 |
| Cords and Streaks | A | A | D | C | D | C | C | C |
| Fish-eyes (number) | 95 | 107 | 404 | 217 | 246 | 260 | 250 | 283 |

According to the above results, in Example 1 having both the olefin content of the acid modified olefin-vinyl carboxylate copolymer (C) and the difference between the ethylene content of the EVOH (B) and the olefin content of the acid modified olefin-vinyl carboxylate copolymer (C) in the range of claims, the molded product was obtained having a less amount of screw buildup, almost no generation of cords and streaks, and also less fish-eyes.

In contrast, in Comparative Examples 1, 5, and 6 not containing the acid modified olefin-vinyl carboxylate copolymer (C), in Comparative Example 2 having a large olefin content of the acid modified olefin-vinyl carboxylate copolymer (C), in Comparative Example 3 having a large difference between the ethylene content of the EVOH (B) and the olefin content of the acid modified olefin-vinyl carboxylate copolymer (C), and in Comparative Example 4 having the difference smaller, improvement in the amount of screw buildup, the generation of cords and streaks, and the generation of fish-eyes was insufficient.

Examples 12 Through 15

In a same manner as Example 1 other than modifying the amount of C-1 to be blended to mass ratios described in Table 2 respectively, a resin mixture was obtained, and the respective evaluation was carried out using the resin mixture thus obtained. Results are shown in Table 2 in collection.

Example 16

In a same manner as Example 1 other than modifying the thickness of each layer in the multilayer film to polyolefin layer/adhesive resin layer/EVOH layer/adhesive resin layer/polyolefin layer=200μ/20μ/4μ/20μ/200μ and dry blending so as to make the amount of C-1 to be blended at a mass ratio of recovery/C-1/pigment=100/0.02/0.3, a resin mixture was obtained, and the respective evaluation was carried out using the resin mixture thus obtained. Results are shown in Table 2 in collection.

Example 17

In a same manner as Example 1 other than modifying the thickness of each layer in the multilayer film to polyolefin layer/adhesive resin layer/EVOH layer/adhesive resin layer/polyolefin layer=200μ/20μ/150μ/20μ/200μ, a resin mixture was obtained, and the respective evaluation was carried out using the resin mixture thus obtained. Results are shown in Table 2 in collection.

TABLE 2

|  | Example 12 | Example 13 | Example 14 | Example 15 | Example 16 | Example 17 |
|---|---|---|---|---|---|---|
| Type of EVOH (B) | B-1 | B-1 | B-1 | B-1 | B-1 | B-1 |
| Type of Acid Modified Olefin-Vinyl Carboxylate Copolymer (C) | C-1 | C-1 | C-1 | C-1 | C-1 | C-1 |
| Resin Mixture (parts by mass) | | | | | | |
| Polyolefin (A) | 85.9 | 85.9 | 85.9 | 85.9 | 89.9 | 63.3 |
| EVOH (B) | 5.5 | 5.5 | 5.5 | 5.5 | 1.1 | 30.3 |
| Adhesive Resin | 8.6 | 8.6 | 8.6 | 8.6 | 9.0 | 6.3 |
| Acid Modified Olefin-Vinyl Carboxylate Copolymer (C) | 0.03 | 0.08 | 1.5 | 2.0 | 0.02 | 0.45 |
| Pigment | 0.3 | 0.3 | 0.3 | 0.3 | 0.3 | 0.3 |
| Composition Ratio (mass %) | | | | | | |
| (C/B) | 0.5 | 1.5 | 27.3 | 36.4 | 1.8 | 1.5 |
| (B/Total Amount of Resin Composition) | 5.5 | 5.5 | 5.4 | 5.4 | 1.1 | 30.1 |
| Alkali Metal/Amount of Acid Modification (molar ratio) | 1.70 | 1.33 | 0.19 | 0.15 | 1.28 | 0.74 |
| Evaluation Results | | | | | | |
| Amount of Screw Buildup (mg) | 2482 | 2219 | 1681 | 2009 | 948 | 2485 |
| Cords and Streaks | B | A | A | A | A | A |
| Fish-eyes (number) | 157 | 83 | 91 | 178 | 66 | 161 |

Example 18

Using C-1 as the acid modified olefin-vinyl carboxylate copolymer (C) and D-1 as the unmodified olefin-vinyl carboxylate copolymer (D), they were melt kneaded to have a mass ratio of C-1/D-1=0.45/2.55 in a corotating twin screw extruder (TEX-30N manufactured by Japan Steel Works, Ltd.) of 30 mmφ at an extrusion temperature of 200° C. to obtain a masterbatch (MB).

Using the recovery obtained in a same manner as Example 1, they dry blended at a mass ratio of recovery/MB/pigment=100/3/0.3 to obtain a resin mixture. The respective evaluation was carried out in the above method using the resin mixture thus obtained. Results are shown in Table 3 in collection.

Examples 19 and 20

In a same manner as Example 18 other than using copolymers described in Table 3 respectively as the unmodified olefin-vinyl carboxylate copolymer (D), a resin mixture was obtained, and the respective evaluation was carried out using the resin mixture thus obtained. Results are shown in Table 3 in collection.

Example 21

Using C-1 as the acid modified olefin-vinyl carboxylate copolymer (C) and D-1 as the unmodified olefin-vinyl carboxylate copolymer (D), they were melt kneaded to have a mass ratio of C-1/D-1=0.45/0.2 in a corotating twin screw extruder (TEX-30N manufactured by Japan Steel Works, Ltd.) of 30 mmϕ at an extrusion temperature of 200° C. to obtain a masterbatch (MB).

Using the recovery obtained in a same manner as Example 1, they dry blended at a mass ratio of recovery/MB/pigment=100/0.64/0.3 to obtain a resin mixture. The respective evaluation was carried out in the above method using the resin mixture thus obtained. Results are shown in Table 3 in collection.

Example 22

Using C-1 as the acid modified olefin-vinyl carboxylate copolymer (C) and D-1 as the unmodified olefin-vinyl carboxylate copolymer (D), they were melt kneaded to have a mass ratio of C-1/D-1=0.45/9.5 in a corotating twin screw extruder (TEX-30N manufactured by Japan Steel Works, Ltd.) of 30 mmϕ at an extrusion temperature of 200° C. to obtain a masterbatch (MB).

Using the recovery obtained in a same manner as Example 1, they dry blended at a mass ratio of recovery/MB/pigment=100/9.55/0.3 to obtain a resin mixture. The respective evaluation was carried out in the above method using the resin mixture thus obtained. Results are shown in Table 3 in collection.

Example 23

Using C-1 as the acid modified olefin-vinyl carboxylate copolymer (C), D-1 as the unmodified olefin-vinyl carboxylate copolymer (D), and E-1 as the lubricant (E), they were melt kneaded to have a mass ratio of C-1/D-1/E-1=0.45/2.55/0.005 in a corotating twin screw extruder (TEX-30N manufactured by Japan Steel Works, Ltd.) of 30 mmϕ at an extrusion temperature of 200° C. to obtain a masterbatch (MB).

Using the recovery obtained in a same manner as Example 1, they dry blended at a mass ratio of recovery/MB/pigment=100/3.005/0.3 to obtain a resin mixture. The respective evaluation was carried out in the above method using the resin mixture thus obtained. Results are shown in Table 3 in collection.

Example 24

In a same manner as Example 23 other than having a mass ratio of C-1/D-1/E-1=0.45/2.55/0.03, an MB was obtained.

Using the recovery obtained in a same manner as Example 1, they dry blended at a mass ratio of recovery/MB/pigment=100/3.03/0.3 to obtain a resin mixture. The respective evaluation was carried out in the above method using the resin mixture thus obtained. Results are shown in Table 3 in collection.

Example 25

In a same manner as Example 23 other than having a mass ratio of C-1/D-1/E-1=0.45/2.55/0.3, an MB was obtained.

Using the recovery obtained in a same manner as Example 1, they dry blended at a mass ratio of recovery/MB/pigment=100/3.3/0.3 to obtain a resin mixture. The respective evaluation was carried out in the above method using the resin mixture thus obtained. Results are shown in Table 3 in collection.

Example 26

In a same manner as Example 23 other than using E-2 as the lubricant (E) and having a mass ratio of C-1/D-1/E-2=0.45/2.55/0.03, an MB was obtained.

Using the recovery obtained in a same manner as Example 1, they dry blended at a mass ratio of recovery/MB/pigment=100/3.03/0.3 to obtain a resin mixture. The respective evaluation was carried out in the above method using the resin mixture thus obtained. Results are shown in Table 3 in collection.

Example 27

In a same manner as Example 23 other than using E-3 as the lubricant (E) and having a mass ratio of C-1/D-1/E-3=0.45/2.55/0.15, an MB was obtained.

Using the recovery obtained in a same manner as Example 1, they dry blended at a mass ratio of recovery/MB/pigment=100/3.15/0.3 to obtain a resin mixture. The respective evaluation was carried out in the above method using the resin mixture thus obtained. Results are shown in Table 3 in collection.

Example 28

Using C-1 as the acid modified olefin-vinyl carboxylate copolymer (C), D-1 as the unmodified olefin-vinyl carboxylate copolymer (D), E-1 as the lubricant (E), and hydrotalcite, they were melt kneaded to have a mass ratio of C-1/D-1/E-1/hydrotalcite=0.45/2.55/0.03/0.15 in a corotating twin screw extruder (TEX-30N manufactured by Japan Steel Works, Ltd.) of 30 mmϕ at an extrusion temperature of 200° C. to obtain a masterbatch (MB).

Using the recovery obtained in a same manner as Example 1, they dry blended at a mass ratio of recovery/MB/pigment=100/3.18/0.3 to obtain a resin mixture. The respective evaluation was carried out in the above method using the resin mixture thus obtained. Results are shown in Table 3 in collection.

TABLE 3

| | Example 18 | Example 19 | Example 20 | Example 21 | Example 22 | Example 23 | Example 24 | Example 25 | Example 26 | Example 27 | Example 28 |
|---|---|---|---|---|---|---|---|---|---|---|---|
| Type of EVOH (B) | B-1 | B-1 | B-1 | B-1 | B-1 | B-1 | B-1 | B-1 | B-1 | B-1 | B-1 |
| Type of Acid Modified Olefin-Vinyl Carboxylate Copolymer (C) | C-1 | C-1 | C-1 | C-1 | C-1 | C-1 | C-1 | C-1 | C-1 | C-1 | C-1 |
| Type of Unmodified Olefin-Vinyl Carboxylate Copolymer (D) | D-1 | D-2 | D-3 | D-1 | D-1 | D-1 | D-1 | D-1 | D-1 | D-1 | D-1 |
| Olefin Content (mol %) | 89 | 97 | 82 | 89 | 89 | 89 | 89 | 89 | 89 | 89 | 89 |
| Type of Lubricant (E) | none | none | none | none | none | E-1 | E-1 | E-1 | E-2 | E-3 | E-1 |

TABLE 3-continued

|  | Example 18 | Example 19 | Example 20 | Example 21 | Example 22 | Example 23 | Example 24 | Example 25 | Example 26 | Example 27 | Example 28 |
|---|---|---|---|---|---|---|---|---|---|---|---|
| Resin Mixture (parts by mass) | | | | | | | | | | | |
| Polyolefin (A) | 85.9 | 85.9 | 85.9 | 85.9 | 85.9 | 85.9 | 85.9 | 85.9 | 85.9 | 85.9 | 85.9 |
| EVOH (B) | 5.5 | 5.5 | 5.5 | 5.5 | 5.5 | 5.5 | 5.5 | 5.5 | 5.5 | 5.5 | 5.5 |
| Adhesive Resin | 8.6 | 8.6 | 8.6 | 8.6 | 8.6 | 8.6 | 8.6 | 8.6 | 8.6 | 8.6 | 8.6 |
| Acid Modified Olefin-Vinyl Carboxylate Copolymer (C) | 0.45 | 0.45 | 0.45 | 0.45 | 0.45 | 0.45 | 0.45 | 0.45 | 0.45 | 0.45 | 0.45 |
| Unmodified Olefin-Vinyl Carboxylate Copolymer (D) | 2.55 | 2.55 | 2.55 | 0.2 | 9.5 | 2.55 | 2.55 | 2.55 | 2.55 | 2.55 | 2.55 |
| Lubricant (E) | 0 | 0 | 0 | 0 | 0 | 0.005 | 0.03 | 0.3 | 0.03 | 0.15 | 0.03 |
| Hydrotalcite | 0 | 0 | 0 | 0 | 0 | 0 | 0 | 0 | 0 | 0 | 0.15 |
| Pigment | 0.3 | 0.3 | 0.3 | 0.3 | 0.3 | 0.3 | 0.3 | 0.3 | 0.3 | 0.3 | 0.3 |
| Composition Ratio (mass %) | | | | | | | | | | | |
| (D/Total Amount of Resin Composition) | 2.47 | 2.47 | 2.47 | 0.20 | 8.62 | 2.47 | 2.47 | 2.46 | 2.47 | 2.46 | 2.46 |
| (E/Total Amount of Resin Composition) | 0.0 | 0.0 | 0.0 | 0.0 | 0.0 | 0.005 | 0.029 | 0.290 | 0.029 | 0.145 | 0.029 |
| Evaluation Results | | | | | | | | | | | |
| Amount of Screw Buildup (mg) | 1404 | 1570 | 1521 | 1606 | 1521 | 1101 | 965 | 1632 | 1033 | 1320 | 976 |
| Cords And Streaks | A | A | A | A | B | A | A | A | A | A | A |
| Fish-eyes (number) | 76 | 87 | 85 | 93 | 111 | 76 | 61 | 93 | 61 | 102 | 70 |

The invention claimed is:

1. A resin mixture, comprising:
   polyolefin;
   a saponified ethylene-vinyl acetate copolymer;
   an acid modified olefin-vinyl carboxylate copolymer which, prior to acid-modification, consists of an olefin monomer and a vinyl carboxylate monomer;
   an olefin-vinyl carboxylate copolymer that is not acid-modified and which consists of an olefin monomer and a vinyl carboxylate monomer,
   wherein the acid modified olefin-vinyl carboxylate copolymer has an olefin content of from 50 to 95 mol %,
   wherein a difference between an ethylene content of the saponified ethylene-vinyl acetate copolymer and the olefin content of the acid modified olefin-vinyl carboxylate copolymer is from 20 to 70 mol %,
   wherein the saponified ethylene-vinyl acetate copolymer has a ratio of 0.03 mol % or more of a total of a carboxylic acid unit and a lactone ring unit in a polymer terminal to a total of an ethylene unit, a vinyl alcohol unit and a vinyl ester unit,
   wherein the saponified ethylene-vinyl acetate copolymer has an ethylene content of from 25 to 60 mol % and has a degree of saponification of 80% or more,
   wherein the olefin-vinyl carboxylate copolymer that is not acid-modified has an olefin content of from 50 to 98 mol %, and the resin mixture comprises the olefin-vinyl carboxylate copolymer that is not acid-modified in an amount of from 0.01 to 20 mass % to a total of the resin mixture, and
   wherein a mass ratio of the acid modified olefin-vinyl carboxylate copolymer to the olefin-vinyl carboxylate copolymer that is not acid-modified is from 0.45/2.55 to 0.45/0.2.

2. The resin mixture according to claim 1,
   wherein the acid modified olefin-vinyl carboxylate copolymer comprises acid modification in an amount of from 0.01 to 2 mmol/g.

3. The resin mixture according to claim 1, wherein a content of the acid modified olefin-vinyl carboxylate copolymer ranges from 0.1 to 30 parts by mass relative to 100 parts by mass of the saponified ethylene-vinyl acetate copolymer.

4. The resin mixture according to claim 1,
   wherein the resin mixture comprises the saponified ethylene-vinyl acetate copolymer in an amount of from 0.1 to 30 mass %.

5. The resin mixture according to claim 1,
   wherein a difference in solubility parameters between the acid modified olefin-vinyl carboxylate copolymer and the saponified ethylene-vinyl acetate copolymer is from 0.5 to 4.0 $(cal/cm^3)^{1/2}$.

6. The resin mixture according to claim 1, further comprising:
   an olefin-vinyl carboxylate copolymer that is not acid-modified and which consists of an olefin monomer and a vinyl carboxylate monomer,
   wherein the olefin-vinyl carboxylate copolymer that is not acid-modified has an olefin content of from 55 to 98 mol %, and the resin mixture comprises the olefin-vinyl carboxylate copolymer that is not acid modified in an amount of from 0.01 to 20 mass % to a total of the resin mixture.

7. The resin mixture according to claim 1, further comprising:
   a lubricant,
   wherein the resin mixture comprises the lubricant in an amount of from 0.005 to 1.0 mass %.

8. The resin mixture according to claim 1, further comprising:
   a pigment,
   wherein the resin mixture comprises the pigment in an amount of from 0.0001 to 10 mass %.

9. A multilayer structure, comprising a layer obtained by a process comprising melt molding the resin mixture according to claim 1.

10. The resin mixture according to claim 3,
    wherein the acid modified olefin-vinyl carboxylate copolymer comprises acid modification in an amount of from 0.01 to 2 mmol/g.

11. The resin mixture according to claim 3,
    wherein the resin mixture comprises the saponified ethylene-vinyl acetate copolymer in an amount of from 0.1 to 30 mass %.

12. The resin mixture according to claim 3,
wherein a difference in solubility parameters between the acid modified olefin-vinyl carboxylate copolymer and the saponified ethylene-vinyl acetate copolymer is from 0.5 to 4.0 $(cal/cm^3)^{1/2}$.

13. The resin mixture according to claim 3, further comprising:
an olefin-vinyl carboxylate copolymer that is not acid-modified and which consists of an olefin monomer and a vinyl carboxylate monomer,
wherein the olefin-vinyl carboxylate copolymer that is not acid-modified has an olefin content of from 50 to 98 mol %, and the resin mixture comprises the olefin-vinyl carboxylate copolymer that is not acid modified in an amount of from 0.01 to 20 mass % to a total of the resin mixture.

14. The resin mixture according to claim 3, further comprising:
a lubricant,
wherein the resin mixture comprises the lubricant in an amount of from 0.005 to 1.0 mass %.

15. The resin mixture according to claim 3, further comprising:
a pigment,
wherein the resin mixture comprises the pigment in an amount of from 0.0001 to 10 mass %.

16. A multilayer structure, comprising a layer obtained by a process comprising melt molding the resin mixture according to claim 3.

* * * * *